(12) United States Patent
Pan et al.

(10) Patent No.: US 10,542,583 B1
(45) Date of Patent: Jan. 21, 2020

(54) METHOD AND APPARATUS OF HANDLING SIDELINK RECEPTION IN A WIRELESS COMMUNICATION SYSTEM

(71) Applicant: ASUSTek Computer Inc., Taipei (TW)

(72) Inventors: Li-Te Pan, Taipei (TW); Li-Chih Tseng, Taipei (TW); Wei-Yu Chen, Taipei (TW); Ming-Che Li, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/453,818

(22) Filed: Jun. 26, 2019

Related U.S. Application Data

(60) Provisional application No. 62/692,540, filed on Jun. 29, 2018.

(51) Int. Cl.
| | |
|---|---|
| *H04W 76/30* | (2018.01) |
| *H04W 28/06* | (2009.01) |
| *H04W 80/08* | (2009.01) |
| *H04L 1/16* | (2006.01) |
| *H04W 80/02* | (2009.01) |
| *H04W 92/18* | (2009.01) |
| *H04W 4/40* | (2018.01) |
| *H04W 76/14* | (2018.01) |

(52) U.S. Cl.
CPC ........... *H04W 80/08* (2013.01); *H04L 1/1642* (2013.01); *H04W 4/40* (2018.02); *H04W 28/06* (2013.01); *H04W 76/14* (2018.02); *H04W 76/30* (2018.02); *H04W 80/02* (2013.01); *H04W 92/18* (2013.01)

(58) Field of Classification Search
CPC ... H04W 28/065; H04W 28/06; H04W 76/30; H04L 1/1896; H04L 1/1864; H04L 69/321
See application file for complete search history.

(56) References Cited

U.S. PATENT DOCUMENTS

| | | | |
|---|---|---|---|
| 8,331,399 B2 | 12/2012 | Meylan | |
| 2015/0305012 A1 | 10/2015 | Yi | |
| 2017/0181207 A1* | 6/2017 | Yi | ......................... H04W 76/14 |
| 2018/0132304 A1* | 5/2018 | Lee | ...................... H04W 76/38 |
| 2018/0324641 A1* | 11/2018 | Tsai | ..................... H04L 69/321 |

(Continued)

OTHER PUBLICATIONS

CATT: "Introduction of V2X duplication to TS 36.323", 3GPP Draft; R2-1809292, 3rd Generation Partnership Project (3GPP), Mobile Competence Centre ; 650, Route Des Lucioles ; F-06921 Sophia-Antipolis Cedex ;France vol. RAN WG2, No. Busan, Korea; May 21, 2018-May 25, 2018 Jun. 7, 2018 (Jun. 7, 2018), pp. 1-6, XP051520616.

(Continued)

*Primary Examiner* — Raj Jain
(74) *Attorney, Agent, or Firm* — Blue Capital Law Firm, P.C.

(57) ABSTRACT

A method and apparatus are disclosed from the perspective of a UE (User Equipment). In one embodiment, the method includes setting a state variable used for the sidelink transmission to "1" when a PDCP (Packet Data Convergence Protocol) entity for the sidelink radio bearer is established. The method also includes performing the sidelink transmission for a very first data unit of the PDCP entity on the sidelink radio bearer, wherein a sequence number of the very first data unit is set to the state variable.

18 Claims, 20 Drawing Sheets

(56) References Cited

U.S. PATENT DOCUMENTS

2018/0368132 A1    12/2018  Babaei
2019/0182853 A1*    6/2019  Yi .......................... H04L 5/0048
2019/0254055 A1*    8/2019  Yi ..................... H04W 28/0278

OTHER PUBLICATIONS

"LTE; Evolved Universal Terrestrial Radio Access (E-UTRA); Packet Data Convergence Protocol (PDCP) specification (3GPP TS 36.323 version 14.5.0 Release 14)", ETSI Technical Specification, European Telecommunications Standards Institute (ETSI), 650, Route Des Lucioles ; F-06921 Sophia-Antipolis ; France vol. 36PP RAN, No. V14.5.0 Jan. 19, 2018 (Jan. 19, 2018), pp. 1-46, XP014311491.
European Search Report from corresponding EP Application No. 19182518.1, dated Nov. 12, 2019.

\* cited by examiner

| Index | LCID values |
|---|---|
| 00000 | Reserved |
| 00001-01010 | Identity of the logical channel |
| 01011-10100 | Identity of the logical channel which is used for duplication |
| 10101-11011 | Reserved |
| 11100 | PC5-S messages that are not protected |
| 11101 | PC5-S messages "Direct Security Mode Command" and "Direct Security Mode Complete" |
| 11110 | Other PC5-S messages that are protected |
| 11111 | Padding |

FIG. 10 (PRIOR ART)

| Index | Size of Length field (in bits) |
|---|---|
| 0 | 7 |
| 1 | 15 |

FIG. 11 (PRIOR ART)

METHOD AND APPARATUS OF HANDLING SIDELINK RECEPTION IN A WIRELESS COMMUNICATION SYSTEM

CROSS-REFERENCE TO RELATED APPLICATIONS

The present Application claims the benefit of U.S. Provisional Patent Application Ser. No. 62/692,540 filed on Jun. 29, 2018, the entire disclosure of which is incorporated herein in its entirety by reference.

FIELD

This disclosure generally relates to wireless communication networks, and more particularly, to a method and apparatus of handling sidelink reception in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment). In one embodiment, the method includes setting a state variable used for the sidelink transmission to "1" when a PDCP (Packet Data Convergence Protocol) entity for the sidelink radio bearer is established. The method also includes performing the sidelink transmission for a very first data unit of the PDCP entity on the sidelink radio bearer, wherein a sequence number of the very first data unit is set to the state variable.

BRIEF DESCRIPTION OF THE DRAWINGS

FIG. 10 is a reproduction of Table 6.2.4-1 of 3GPP R2-1808916.

FIG. 11 is a reproduction of Table 6.2.4-2 of 3GPP R2-1808916.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 36.300 v15.1.0, "Evolved Universal Terrestrial Radio Access (E-UTRA); Overall description; Stage 2"; TS 36.323 v14.5.0, "Evolved Universal Terrestrial Radio Access (E-UTRA); Packet Data Convergence Protocol (PDCP) specification"; R2-1809265, "Introduction of eV2X in TS 36.300"; R2-1808916, "Introduction of eV2X in 36.321"; R2-1808921, "Introduction of V2X duplication to TS 36.323"; and R2-1808917, "Introduction of eV2X in TS 36.331". The standards and documents listed above are hereby expressly incorporated by reference in their entirety.

Figure 1:
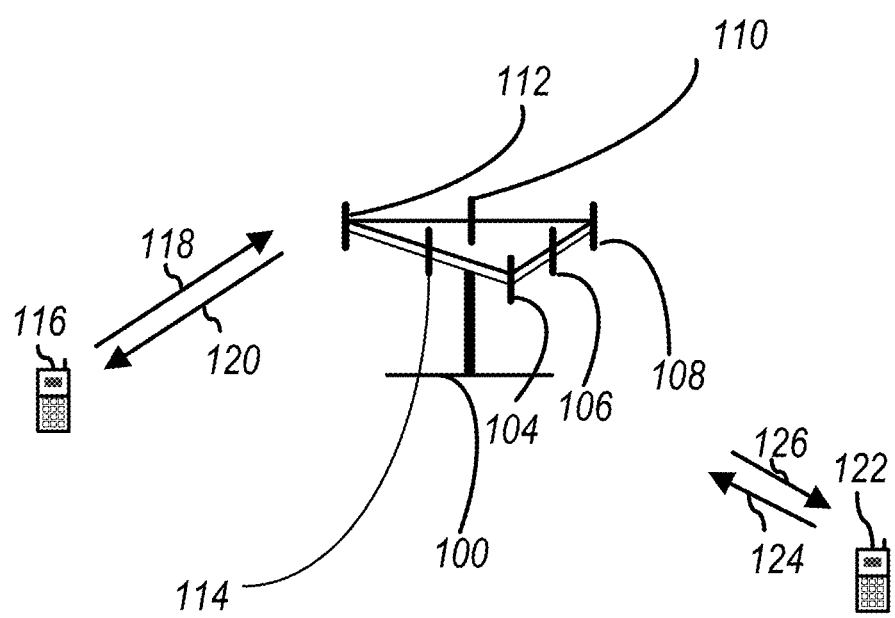
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group.

Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
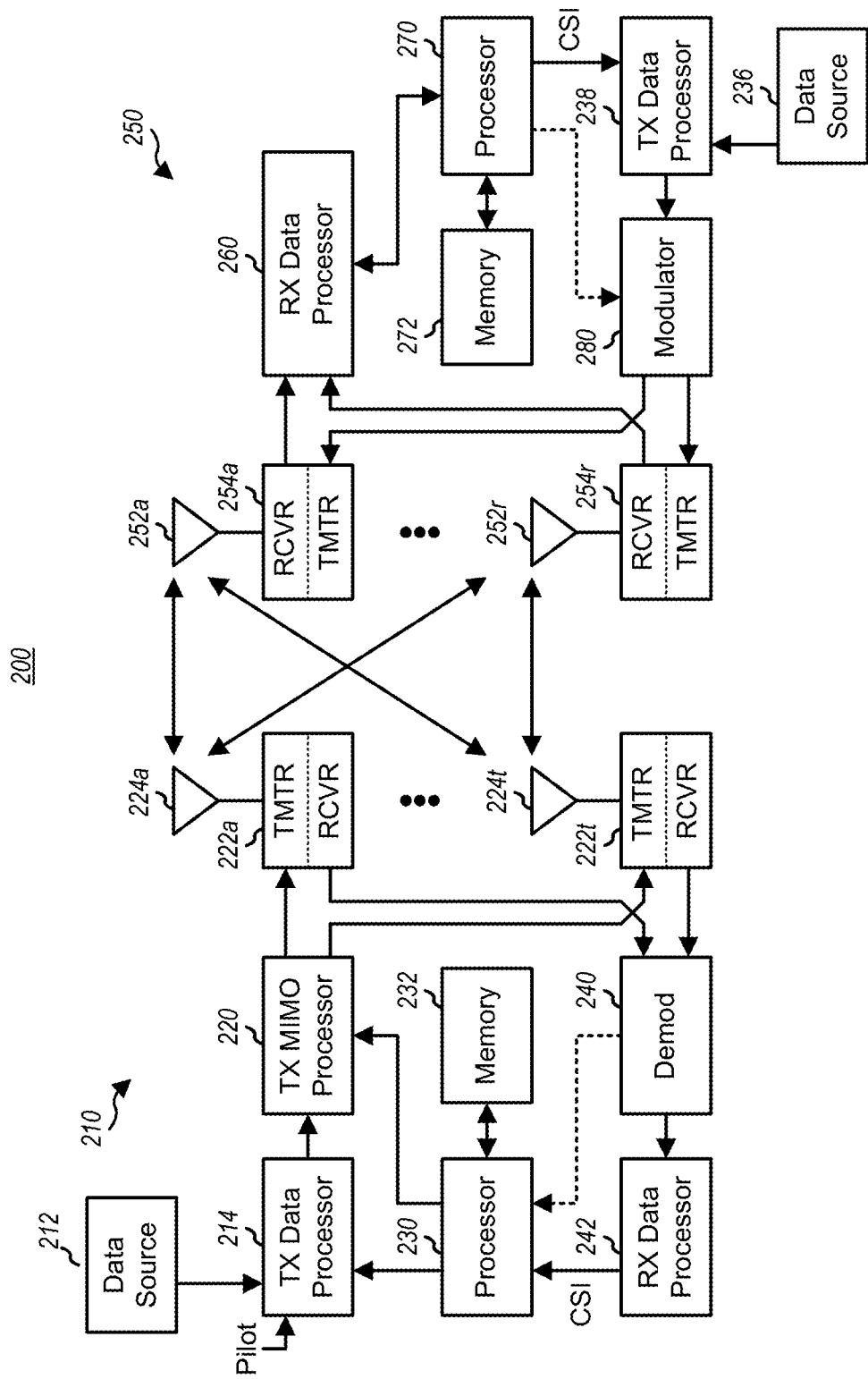
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
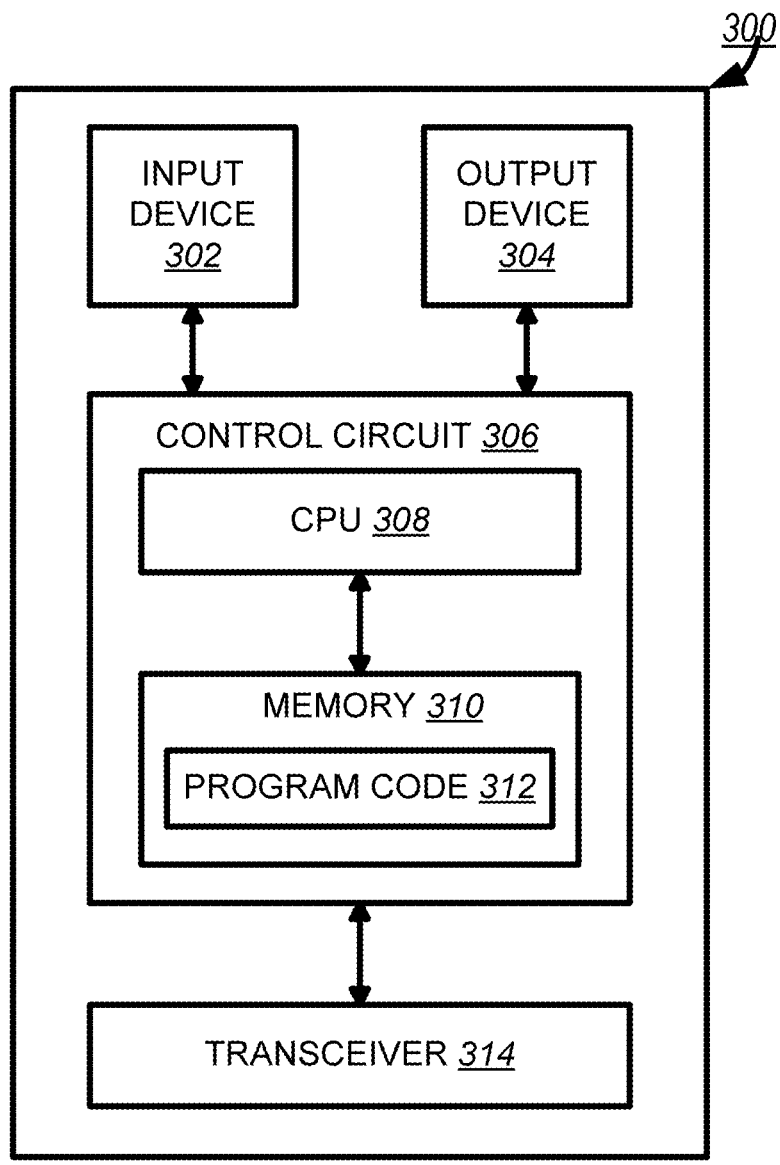
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
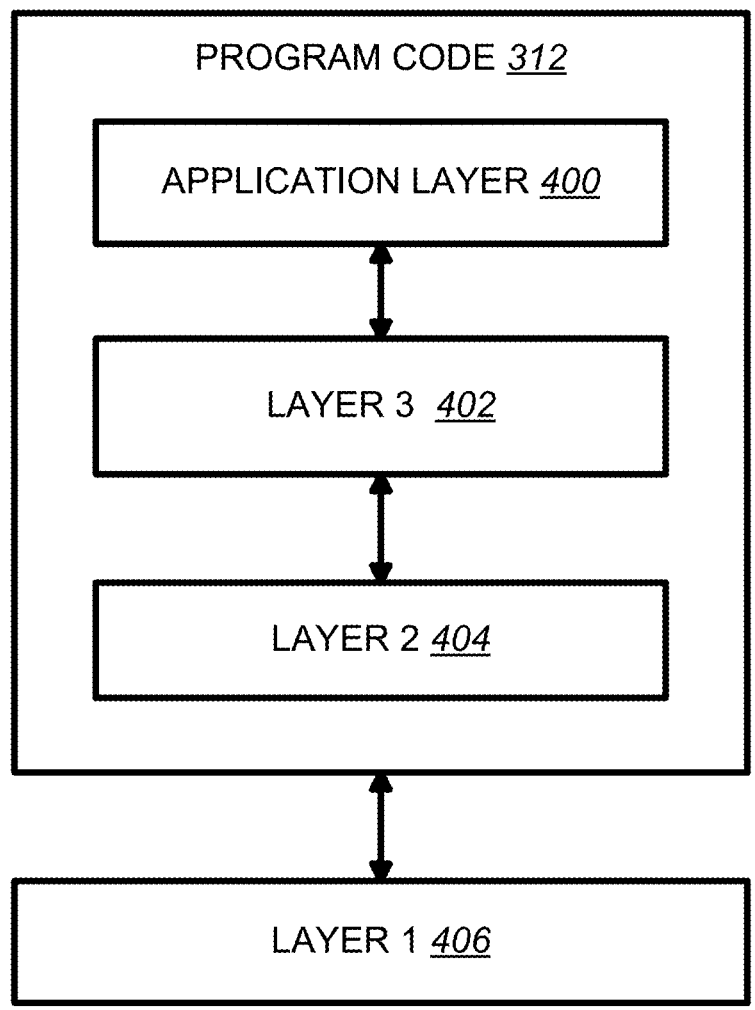
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 36.300 describes related sidelink operation as follows:
6 Layer 2
Layer 2 is split into the following sublayers: Medium Access Control (MAC), Radio Link Control (RLC) and Packet Data Convergence Protocol (PDCP).
This subclause gives a high level description of the Layer 2 sub-layers in terms of services and functions. The three figures below depict the PDCP/RLC/MAC architecture for downlink, uplink and Sidelink, where:
- Service Access Points (SAP) for peer-to-peer communication are marked with circles at the interface between sublayers. The SAP between the physical layer and the MAC sublayer provides the transport channels. The SAPs between the MAC sublayer and the RLC sublayer provide the logical channels.
- The multiplexing of several logical channels (i.e. radio bearers) on the same transport channel (i.e. transport block) is performed by the MAC sublayer;
- In both uplink and downlink, when neither CA nor DC are configured, only one transport block is generated per TTI in the absence of spatial multiplexing;
- In Sidelink, only one transport block is generated per TTI.

Figure 6:
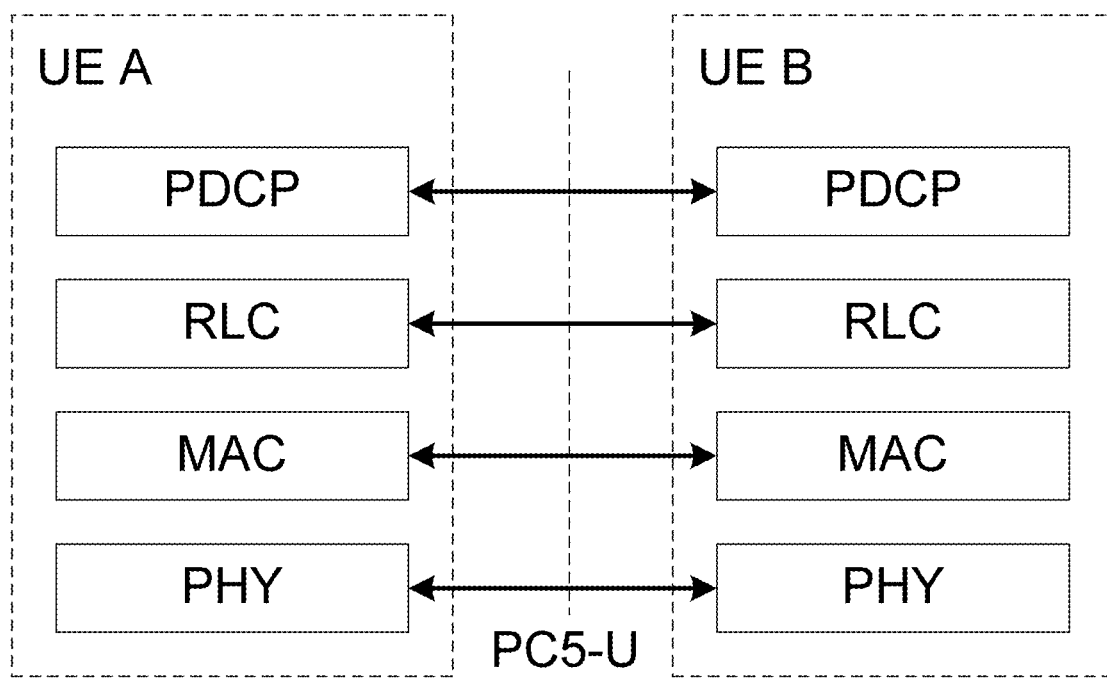
FIG. 6 is a reproduction of FIG. 23.10.2.1-1 of 3GPP TS 36.300 v 15.1.0.

FIG. 6-1, Entitled "Layer 2 Structure for DL", is Omitted

FIG. 6-2: Entitled "Layer 2 Structure for UL" is Omitted

NOTE 1: The eNB may not be able to guarantee that a L2 buffer overflow will never occur. If such overflow occurs, UE may discard packets in the L2 buffer.
NOTE 2: For a NB-IoT UE that only supports Control Plane CIoT EPS optimizations, as defined in TS 24.301 [20], PDCP is bypassed. For a NB-IoT UE that supports Control Plane CIoT EPS optimization and S1-U data transfer or User Plane CIoT EPS optimization, as defined in TS 24.301 [20], PDCP is also bypassed (i.e. not used) until AS security is activated.

Figure 5:
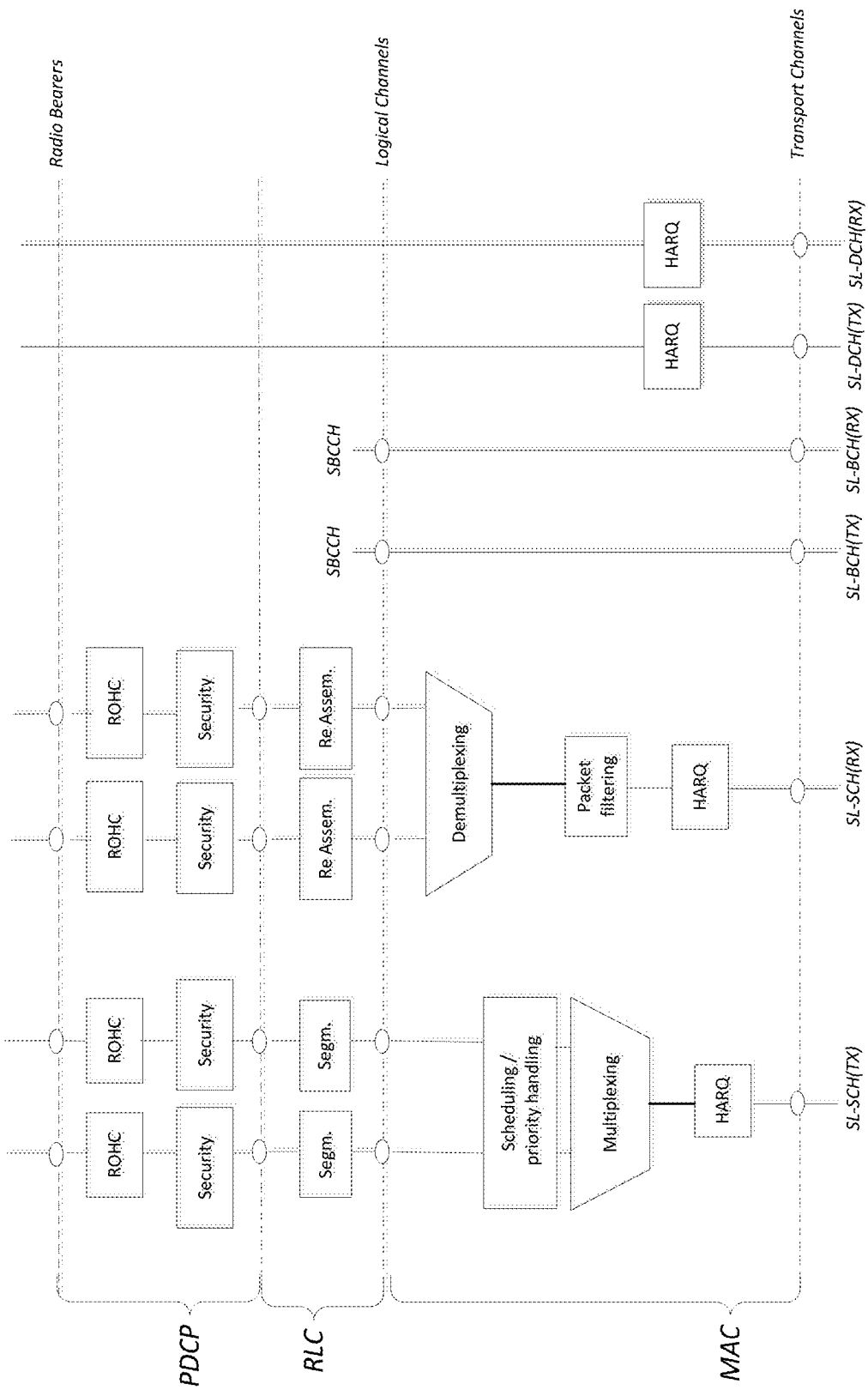
FIG. 5 is a reproduction of FIG. 6-3 of 3GPP TS 36.300 v 15.1.0.

FIG. 6-3 of 3GPP TS 36.300 v 15.1.0, Entitled "Layer 2 Structure for Sidelink", is Reproduced as FIG. 5

[ . . . ]
23.10 Support for Sidelink Communication
23.10.1 General
Sidelink communication is a mode of communication whereby UEs can communicate with each other directly over the PC5 interface [62]. This communication mode is supported when the UE is served by E-UTRAN and when the UE is outside of E-UTRA coverage. Only those UEs authorised to be used for public safety operation can perform sidelink communication.

In order to perform synchronisation for out of coverage operation UE(s) may act as a synchronisation source by transmitting SBCCH and a synchronisation signal. SBCCH carries the most essential system information needed to receive other sidelink channels and signals. SBCCH along with a synchronisation signal is transmitted with a fixed periodicity of 40 ms. When the UE is in network coverage, the contents of SBCCH are derived from the parameters signalled by the eNB. When the UE is out of coverage, if the UE selects another UE as a synchronisation reference, then the content of SBCCH is derived from the received SBCCH; otherwise UE uses pre-configured parameters. SIB18 provides the resource information for synchronisation signal and SBCCH transmission. There are two pre-configured subframes every 40 ms for out of coverage operation. UE receives synchronisation signal and SBCCH in one subframe and transmit synchronisation signal and SBCCH on another subframe if UE becomes synchronisation source based on defined criterion [16].
UE performs sidelink communication on subframes defined over the duration of Sidelink Control period. The Sidelink Control period is the period over which resources allocated in a cell for sidelink control information and sidelink data transmissions occur. Within the Sidelink Control period the UE sends sidelink control information followed by sidelink data. Sidelink control information indicates a Layer 1 ID and characteristics of the transmissions (e.g. MCS, location of the resource(s) over the duration of Sidelink Control period, timing alignment).
The UE performs transmission and reception over Uu and PC5 with the following decreasing priority order in case Sidelink Discovery Gap is not configured:
- Uu transmission/reception (highest priority);
- PC5 sidelink communication transmission/reception;
- PC5 sidelink discovery announcement/monitoring (lowest priority).

The UE performs transmission and reception over Uu and PC5 with the following decreasing priority order in case Sidelink Discovery Gap is configured:
- Uu transmission/reception for RACH;
- PC5 sidelink discovery announcement during a Sidelink Discovery Gap for transmission;
- Non-RACH Uu transmission;
- PC5 sidelink discovery monitoring during a Sidelink Discovery Gap for reception;
- Non-RACH Uu reception;
- PC5 sidelink communication transmission/reception.

23.10.2 Radio Protocol Architecture
In this subclause, the UE radio protocol architecture for sidelink communication is given for the user plane and the control plane.
23.10.2.1 User Plane
FIG. 23.10.2.1-1 shows the protocol stack for the user plane, where PDCP, RLC and MAC sublayers (terminate at the other UE) perform the functions listed for the user plane in subclause 6.
The Access Stratum protocol stack in the PC5 interface consists of PDCP, RLC, MAC and PHY as shown below in FIG. 23.10.2.1-1.

FIG. 23.10.2.1-1 of 3GPP TS 36.300 v 15.1.0, Entitled "User-Plane Protocol Stack for Sidelink Communication", is Reproduced as FIG. 6

User plane details of sidelink communication:
- There is no HARQ feedback for sidelink communication;
- RLC UM is used for sidelink communication;

A receiving UE needs to maintain at least one RLC UM entity per transmitting peer UE;

A receiving RLC UM entity used for sidelink communication does not need to be configured prior to reception of the first RLC UMD PDU;

ROHC Unidirectional Mode is used for header compression in PDCP for sidelink communication.

A UE may establish multiple logical channels. LCID included within the MAC subheader uniquely identifies a logical channel within the scope of one Source Layer-2 ID and Destination Layer-2 ID combination. Parameters for logical channel prioritization are not configured. The Access stratum (AS) is provided with the PPPP of a protocol data unit transmitted over PC5 interface by higher layer. There is a PPPP associated with each logical channel.

23.10.2.2 Control Plane

A UE does not establish and maintain a logical connection to receiving UEs prior to one-to-many a sidelink communication. Higher layer establishes and maintains a logical connection for one-to-one sidelink communication including ProSe UE-to-Network Relay operation.

The Access Stratum protocol stack for SBCCH in the PC5 interface consists of RRC, RLC, MAC and PHY as shown below in FIG. 23.10.2.2-1.

Figure 7:
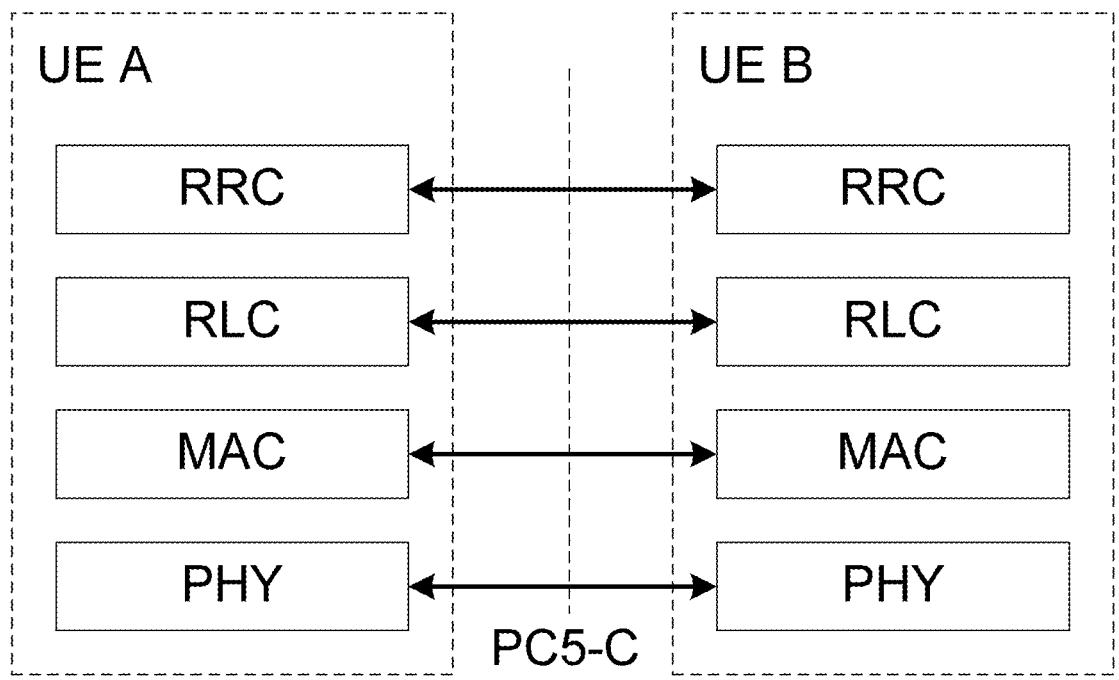
FIG. 7 is a reproduction of FIG. 23.10.2.2-1 of 3GPP TS 36.300 v 15.1.0.

FIG. 23.10.2.2-1 of 3GPP TS 36.300 v 15.1.0, Entitled "Control-Plane Protocol Stack for SBCCH", is Reproduced as FIG. 7

The control plane for establishing, maintaining and releasing the logical connection for one-to-one sidelink communication is shown in FIG. 23.10.2.2-2.

Figure 8:
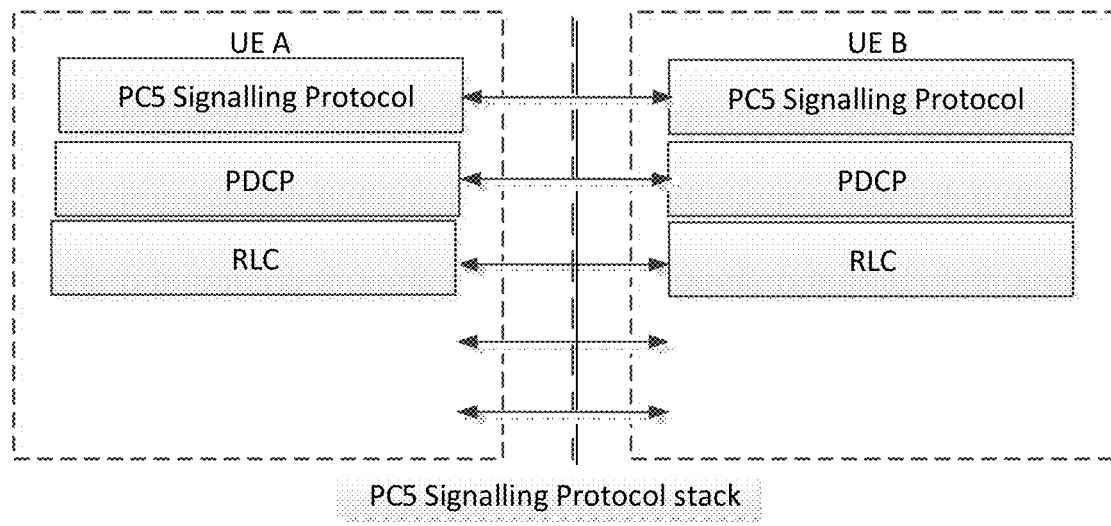
FIG. 8 is a reproduction of FIG. 23.10.2.2-2 of 3GPP TS 36.300 v 15.1.0.

FIG. 23.10.2.2-2 of 3GPP TS 36.300 v 15.1.0, Entitled "Control-Plane Protocol Stack for One-to-One Sidelink Communication", is Reproduced as FIG. 8

[ . . . ]

23.14 Support for V2X Services 23.14.1 General

Vehicular communication services, represented by V2X services, can consist of the following four different types: V2V, V2I, V2N and V2P [71].

V2X services can be provided by PC5 interface and/or Uu interface. Support of V2X services via PC5 interface is provided by V2X sidelink communication, which is a mode of communication whereby UEs can communicate with each other directly over the PC5 interface [62]. This communication mode is supported when the UE is served by E-UTRAN and when the UE is outside of E-UTRA coverage. Only the UEs authorised to be used for V2X services can perform V2X sidelink communication.

23.14.1.1 Support for V2X Sidelink Communication

The user plane protocol stack and functions, as specified in subclause 23.10.2.1 for sidelink communication, are also used for V2X sidelink communication. In addition, for V2X sidelink communication:

STCH for sidelink communication is also used for V2X sidelink communication.

Non-V2X (e.g. Public Safety) data is not multiplexed with V2X data transmitted in resources configured for V2X sidelink communication.

The Access Stratum (AS) is provided with the PPPP of a protocol data unit transmitted over PC5 interface by upper layers. The packet delay budget (PDB) of the protocol data unit can be determined from the PPPP. The low PDB is mapped to the high priority PPPP value [72].

The existing logical channel prioritization based on PPPP is used for V2X sidelink communication.

Control plane protocol stack for SBCCH as specified in subclause 23.10.2.2 for sidelink communication is also used for V2X sidelink communication.

The UE supporting V2X sidelink communication can operate in two modes for resource allocation:

Scheduled resource allocation, characterized by:
  The UE needs to be RRC_CONNECTED in order to transmit data;
  The UE requests transmission resources from the eNB. The eNB schedules transmission resources for transmission of sidelink control information and data. Sidelink SPS is supported for scheduled resource allocation;

UE autonomous resource selection, characterized by:
  The UE on its own selects resources from resource pools and performs transport format selection to transmit sidelink control information and data;
  If mapping between the zones and V2X sidelink transmission resource pools is configured, the UE selects V2X sidelink resource pool based on the zone UE is located in.
  The UE performs sensing for (re)selection of sidelink resources. Based on sensing results, the UE (re) selects some specific sidelink resources and reserves multiple sidelink resources. Up to 2 parallel independent resource reservation processes are allowed to be performed by the UE. The UE is also allowed to perform a single resource selection for its V2X sidelink transmission.

In order to assist the eNB to provide sidelink resources, the UE in RRC_CONNECTED may report geographical location information to the eNB. The eNB can configure the UE to report the complete UE geographical location information based on periodic reporting via the existing measurement report signaling.

Geographical zones can be configured by the eNB or pre-configured. When zones are (pre)configured, the world is divided into geographical zones using a single fixed reference point (i.e. geographical coordinates (0, 0)), length and width. The UE determines the zone identity by means of modulo operation using length and width of each zone, number of zones in length, number of zones in width, the single fixed reference point and the geographical coordinates of the UE's current location. The length and width of each zone, number of zones in length and number of zones in width are provided by the eNB when the UE is in coverage and pre-configured when the UE is out of coverage. The zone is configurable for both in coverage and out of coverage.

For in coverage UE, when the UE uses UE autonomous resource selection, the eNB can provide the mapping between zone(s) and V2X sidelink transmission resource pools in RRC signalling. For out of coverage UEs, the mapping between the zone(s) and V2X sidelink transmission resource pools can be pre-configured. If a mapping between zone(s) and V2X sidelink transmission resource pool is (pre-)configured, the UE selects transmission sidelink resources from the resource pool corresponding to the zone where it is currently located. The zone concept is not applied to exceptional V2X sidelink transmission pools as well as reception pools. Resource pools for V2X sidelink communication are not configured based on priority.

For V2X sidelink transmission, during handover, transmission resource pool configurations including exceptional transmission resource pool for the target cell can be signaled in the handover command to reduce the transmission interruption. In this way, the UE may use the V2X sidelink transmission resource pools of the target cell before the handover is completed as long as either synchronization is performed with the target cell in case eNB is configured as synchronization source or synchronization is performed with GNSS in case GNSS is configured as synchronization source. If the exceptional transmission resource pool is included in the handover command, the UE uses randomly selected resources from the exceptional transmission resource pool, starting from the reception of handover command. If the UE is configured with scheduled resource allocation in the handover command, the UE continues to use the exceptional transmission resource pool while the timer associated with handover is running. If the UE is configured with autonomous resource selection in the target cell the UE continues to use the exceptional transmission resource pool until the sensing results on the transmission resource pools for autonomous resource selection are available. For exceptional cases (e.g. during RLF, during transition from RRC IDLE to RRC CONNECTED or during change of dedicated V2X sidelink resource pools within a cell), the UE may select resources in the exceptional pool provided in serving cell's SIB21 or in dedicated signalling based on random selection, and uses them temporarily. During cell reselection, the RRC_IDLE UE may use the randomly selected resources from the exceptional transmission resource pool of the reselected cell until the sensing results on the transmission resource pools for autonomous resource selection are available.

In order to avoid interruption time in receiving V2X messages due to delay in acquiring reception pools broadcasted from the target cell, synchronisation configuration and reception resource pool configuration for the target cell can be signaled to RRC_CONNECTED UEs in the handover command. For RRC_IDLE UE, it is up to UE implementation to minimize V2X sidelink transmission/reception interruption time associated with acquisition of SIB21 of the target cell.

A UE is considered in-coverage on the carrier used for V2X sidelink communication whenever it detects a cell on that carrier as per criteria specified in [16]. If the UE that is authorized for V2X sidelink communication is in-coverage on the frequency used for V2X sidelink communication or if the eNB provides V2X sidelink configuration for that frequency (including the case where UE is out of coverage on that frequency), the UE uses the scheduled resource allocation or UE autonomous resource selection as per eNB configuration. When the UE is out of coverage on the frequency used for V2X sidelink communication and if the eNB does not provide V2X sidelink configuration for that frequency, the UE may use a set of transmission and reception resource pools pre-configured in the UE. V2X sidelink communication resources are not shared with other non-V2X data transmitted over sidelink.

An RRC_CONNECTED UE may send a Sidelink UE Information message to the serving cell if it is interested in V2X sidelink communication transmission in order to request sidelink resources.

If the UE is configured by upper layers to receive V2X sidelink communication and V2X sidelink reception resource pools are provided, the UE receives on those provided resources.

Reception of V2X sidelink communication in different carriers/PLMNs can be supported by having multiple receiver chains in the UE.

For sidelink SPS, maximum 8 SPS configurations with different parameters can be configured by eNB and all SPS configurations can be active at the same time. The activation/deactivation of SPS configuration is signalled via PDCCH by eNB. The existing logical channel prioritization based on PPPP is used for sidelink SPS.

UE assistance information can be provided to eNB. Reporting of UE assistance information is configured by eNB for V2X sidelink communication. The UE assistance information used for V2X sidelink communication includes traffic characteristic parameters (e.g. a set of preferred SPS interval, timing offset with respect to subframe 0 of the SFN 0, PPPP and maximum TB size based on observed traffic pattern) related to the SPS configuration. The UE assistance information can be reported in case either SPS is already configured or not. Triggering of UE assistance information transmission is left to UE implementation. For instance, the UE is allowed to report UE assistance information when change in estimated periodicity and/or timing offset of packet arrival occurs. SR mask per traffic type is not supported for V2X sidelink communication.

The serving cell can provide synchronization configuration for the carrier used for V2X sidelink communication. In this case, the UE follows the synchronization configuration received from serving cell. In case there is no cell detected on the carrier used for V2X sidelink communication and the UE does not receive synchronization configuration from serving cell, the UE follows preconfigured synchronization configuration. There are three types of synchronization reference, namely eNB, UE and GNSS. In case GNSS is configured as synchronization source, the UE utilizes the UTC time and (pre)configured DFN offset to calculate direct frame number and subframe number. In case eNB timing is configured as synchronization reference to the UE, for synchronization and DL measurements, the UE follows the cell associated with the concerned frequency (when in-coverage on this frequency), or the PCell or the serving cell (when out of coverage on the concerned frequency). UE can indicate the current synchronization reference type it is using to the eNB. One transmission pool for scheduled resource allocation is configured, taking into account the synchronization reference of the UE.

For controlling channel utilization, the network is able to indicate how the UE adapts its transmission parameters for each transmission pool depending on the Channel Busy Ratio (CBR). The UE measures all the configured transmission pools including exceptional pool. If a pool is (pre) configured such that a UE shall always transmit PSCCH and PSSCH in adjacent resource blocks the UE measures PSCCH and PSSCH resources together. If a pool is (pre) configured such that a UE may transmit PSCCH and the corresponding PSSCH in non-adjacent resource blocks in a subframe then PSSCH pool and PSCCH pool are measured separately.

A UE in RRC_CONNECTED can be configured to report CBR measurement results. For CBR reporting, periodic reporting and event triggered reporting are supported. Two reporting events are introduced for event-triggered CBR reporting. In case PSSCH and PSCCH resources are placed non-adjacently, only PSSCH pool measurement is used for event-triggered CBR reporting. In case PSSCH and PSCCH resources are placed adjacently, CBR measurement of both the PSSCH and PSCCH resources is used for event-triggered CBR reporting. Event-triggered CBR reporting is triggered by overloaded threshold and/or less-loaded threshold. The network can configure which of the transmission pools the UE needs to report.

A UE (regardless of its RRC state) performs transmission parameter adaptation based on the CBR. In case PSSCH and PSCCH resources are placed non-adjacently, only PSSCH pool measurement is used for transmission parameter adaptation. In case PSSCH and PSCCH resources are placed adjacently, CBR measurement of both the PSSCH and PSCCH resources is used for transmission parameter adaptation. When CBR measurements are not available, the default transmission parameters are used. The exemplary adapted transmission parameters include maximum transmission power, range of the number of retransmission per TB, range of PSSCH RB number, range of MCS, maximum limit on channel occupancy ratio. The transmission parameter adaption applies to all transmission pools including exceptional pool.

For V2X sidelink communication, sidelink transmission and/or reception resources including exceptional pool for different frequencies for scheduled resource allocation and UE autonomous resource selection may be provided. The sidelink resources for different frequencies can be provided via dedicated signalling, SIB21 and/or preconfiguration. The serving cell may indicate to the UE only the frequency on which the UE may acquire the resource configuration for V2X sidelink communication. If multiple frequencies and associated resource information are provided, it is up to UE implementation to select the frequency among the provided frequencies. The UE shall not use preconfigured transmission resource if the UE detects a cell providing resource configuration or inter-carrier resource configuration for V2X sidelink communication. Frequencies which may provide V2X sidelink communication resource configuration or cross-carrier configuration can be signalled in SIB21 or pre-configured in the UE. The RRC_IDLE UE may prioritize the frequency that provides cross-carrier resource configuration for V2X sidelink communication during cell reselection.

If the UE supports multiple transmission chains, it may simultaneously transmit on multiple carriers via PC5. For the case where multiple frequencies for V2X are supported, a mapping between V2X service types and V2X frequencies is configured by upper layers. The UE should ensure a V2X service to be transmitted on the corresponding frequency. For scheduled resource allocation, the eNB can schedule a V2X transmission on a frequency based on the Sidelink BSR [13], in which the UE includes the Destination Index uniquely associated with a frequency reported by the UE to the eNB in Sidelink UE Information message as specified in 3GPP TS 36.331 [16].

The UE may receive the V2X sidelink communication of other PLMNs. The serving cell can indicate to the UE the resource configuration for V2X sidelink communication reception for inter-PLMN operation directly or only the frequency on which the UE may acquire the inter-PLMN resource configuration for V2X sidelink communication reception. V2X sidelink communication transmission in other PLMNs is not allowed.

When UL transmission overlaps in time domain with V2X sidelink transmission in the same frequency, the UE prioritizes the V2X sidelink transmission over the UL transmission if the PPPP of sidelink MAC PDU is lower than a (pre)configured PPPP threshold; otherwise, the UE prioritizes the UL transmission over the V2X sidelink transmission. When UL transmission overlaps in time domain with V2X sidelink transmission in different frequency, the UE may prioritize the V2X sidelink transmission over the UL transmission or reduce UL transmission power if the PPPP of sidelink MAC PDU is lower than a (pre)configured PPPP threshold; otherwise, the UE prioritizes the UL transmission over the V2X sidelink transmission or reduces V2X sidelink transmission power. However, if UL transmission is prioritized by upper layer as specified in 3GPP TS 24.386 [75] or random access procedure is performed, the UE prioritizes UL transmission over any V2X sidelink transmission (i.e. irrespectively of the sidelink MAC PDU's PPPP).

Resource pool for transmission of pedestrian UE (P-UE) may be overlapped with resources for V2X sidelink communication. For each transmission pool, resource selection mechanism (i.e. random selection, partial sensing based selection or either random selection or partial sensing based selection), which is allowed to be used in this pool, is also configured. If P-UE is configured to use either random selection or partial sensing based selection for one transmission pool, it is up to UE implementation to select a specific resource selection mechanism. If the P-UE is configured to use partial sensing based selection only, the P-UE shall use partial sensing based selection in the pool. The P-UE shall not do random selection in the pool wherein only partial sensing is allowed. If the eNB does not provide a random selection pool, the P-UEs that support only random selection cannot perform sidelink transmission. In exceptional pool, the P-UE uses random selection. The P-UE can send Sidelink UE Information message to indicate that it requests resource pools for P2X-related V2X sidelink communication transmission as specified in 3GPP TS 36.331 [16].

It is not mandatory for P-UE to support zone based resource selection. The P-UE reports whether it supports zone based resource selection as part of UE capability signalling. If the P-UE supports zone based resource selection, the network can provide zone based configuration via only dedicated signalling.

Power saving of P-UE can be achieved by UE implementation and upper layer mechanisms. P-UE does not perform CBR measurement. However, P-UE adjusts the transmission parameters based on the default transmission parameter configuration, which can be provided to the P-UE via RRC signalling.

To support the co-existence of CEN DSRC and V2X sidelink communication, the upper layers of the UE which is performing V2X sidelink communication send an indication to lower layers when the UE is within the proximity of CEN DSRC tolling station(s).

3GPP R2-1809265 introduces the following descriptions and concepts:

6.4 Carrier Aggregation

In case of CA, the multi-carrier nature of the physical layer is only exposed to the MAC layer for which one HARQ entity is required per serving cell;

- In both uplink and downlink, there is one independent hybrid-ARQ entity per serving cell and one transport block is generated per TTI per serving cell in the absence of spatial multiplexing. Each transport block and its potential HARQ retransmissions are mapped to a single serving cell;
- HARQ operation is asynchronous for Licensed-Assisted Access (LAA) SCells.

FIGS. 6.4-1 of 3GPP R2-1809265, Entitled "Layer 2 Structure for DL with CA Configured", is Omitted FIGS. 6.4-2 of 3GPP R2-1809265, Entitled "Layer 2 Structure for UL with CA Configured", is Omitted In case of CA in sidelink, which applies to V2X sidelink communication, there is one independent HARQ entity per carrier used for V2X sidelink communication and one transport block is generated per TTI per carrier. Each transport block and its potential HARQ retransmissions are mapped to a single carrier.

Figure 9:
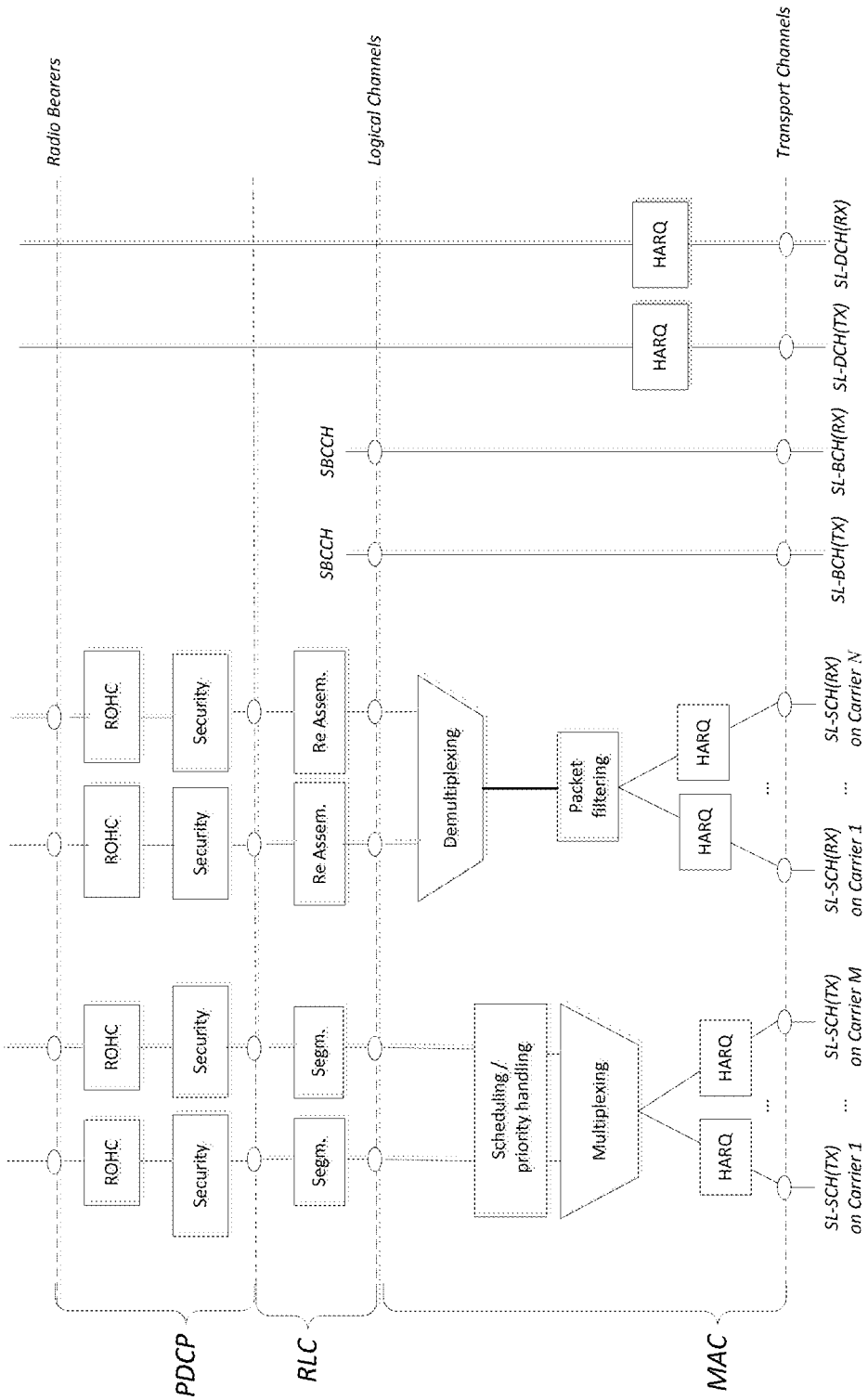
FIG. 9 is a reproduction of FIG. 6.4-x of 3GPP R2-1809265.

FIG. 6.4-x of 3GPP R2-1809265, Entitled "Layer 2 Structure for Sidelink with CA Configured", is Reproduced as FIG. 9

[ . . . ]
23.14.1.1 Support for V2X Sidelink Communication
The user plane protocol stack and functions, as specified in subclause 23.10.2.1 for sidelink communication, are also used for V2X sidelink communication. In addition, for V2X sidelink communication:
  STCH for sidelink communication is also used for V2X sidelink communication.
  Non-V2X (e.g. Public Safety) data is not multiplexed with V2X data transmitted in resources configured for V2X sidelink communication.
  The Access Stratum (AS) is provided with the PPPP and PPPR of a protocol data unit transmitted over PC5 interface by upper layers. The packet delay budget (PDB) of the protocol data unit can be determined from the PPPP. The low PDB is mapped to the high priority PPPP value [72].
  The Access Stratum (AS) is provided with a transmit profile [72] of a protocol data unit transmitted over PC5 interface by upper layers.
  The logical channel prioritization based on PPPP is used for V2X sidelink communication.
[ . . . ]
UE assistance information can be provided to eNB. Reporting of UE assistance information is configured by eNB for V2X sidelink communication. The UE assistance information used for V2X sidelink communication includes traffic characteristic parameters (e.g. a set of preferred SPS interval, timing offset with respect to subframe 0 of the SFN 0, PPPP, PPPR, Destination Layer-2 ID, and maximum TB size based on observed traffic pattern) related to the SPS configuration. The UE assistance information can be reported in case either SPS is already configured or not. Triggering of UE assistance information transmission is left to UE implementation. For instance, the UE is allowed to report UE assistance information when change in estimated periodicity and/or timing offset of packet arrival occurs. SR mask per traffic type is not supported for V2X sidelink communication.
[ . . . ]
Carrier aggregation (CA) in sidelink is supported for V2X sidelink communication. It applies to both in coverage UEs and out of coverage UEs. For CA in sidelink, neither primary component carrier nor secondary component carriers are defined. Each resource pool (pre)configured for V2X sidelink communication transmission or reception is associated to a single carrier. When a UE supporting CA in sidelink uses autonomous resource selection, it performs carrier selection and may select one or more carriers used for V2X sidelink communication transmission. The carrier selection is performed at MAC layer, depending on the CBR of the (pre)configured carriers for V2X sidelink communication and the PPPP(s) of the V2X messages to be transmitted. The carrier reselection may be performed when resource reselection is triggered and is triggered for each sidelink process. In order to avoid frequent switching across different carriers, the UE may keep using a carrier already selected for transmission, if the measured CBR on this carrier is lower than a (pre)configured threshold. For a UE using autonomous resource selection, logical channel prioritization is performed for a sidelink resource on a carrier depending on the CBR measured on the carrier and the PPPP of the sidelink logical channels as specified in 3GPP TS 36.321 [13].
Sidelink packet duplication is supported for V2X sidelink communication and is performed at PDCP layer of the UE. For sidelink packet duplication for transmission, a PDCP PDU is duplicated at the PDCP entity. The duplicated PDCP PDUs of the same PDCP entity are submitted to two different RLC entities and associated to two different sidelink logical channels respectively. The duplicated PDCP PDUs of the same PDCP entity are only allowed to be transmitted on different sidelink carriers. A UE can activate or deactivate sidelink packet duplication based on (pre) configuration. The PPPR value(s) for which sidelink packet duplication is supported can be (pre)configured via a PPPR threshold. For UE autonomous resource selection and scheduled resource allocation, the UE shall perform sidelink packet duplication for the data with the configured PPPR value(s) until packet duplication is deconfigured for these PPPR value(s). For scheduled resource allocation, the UE reports the amount of data associated with one or more PPPR values, and the destination(s) to which the data belongs via sidelink BSR(s). A mapping of PPPR values to logical channel groups can be configured by the eNB, and the PPPR value(s) are reflected by the associated logical channel group ID included in the sidelink BSR(s). A list of PPPR value(s) may be reported in Sidelink UE information by an RRC_CONNECTED UE.
For a UE using scheduled resource allocation, two non-overlapped sets of carriers are configured by the eNB per Destination reported by the UE to the network, and they apply to all the PPPR(s) that are configured for sidelink packet duplication. The UE then associates two duplicated sidelink logical channels corresponding to the same PDCP entity respectively with the two sets of carriers configured for the Destination of the two sidelink logical channels. The association between the duplicated sidelink logical channel and the carrier set is up to UE implementation. Data of a duplicated sidelink logical channel can only be transmitted on the carrier(s) in the associated carrier set.
For V2X sidelink communication reception, packet duplication detection is performed at PDCP layer of the UE. Reordering function is also supported at PDCP layer and how to set the reordering timer at the PDCP layer is up to UE implementation. There are specific logical channel identities which apply to the sidelink logical channel used for sidelink packet duplication exclusively as specified in 3GPP TS 36.321 [13].
  3GPP R2-1808916 introduces the following descriptions and concepts:
6.2.4 MAC Header for SL-SCH
The MAC header is of variable size and consists of the following fields:

V: The MAC PDU format version number field indicates which version of the SL-SCH subheader is used. In this version of the specification three format versions are defined, and this field shall therefore be set to "0001", "0010", and "0011". If the DST field is 24 bits this field shall be set to "0011". The V field size is 4 bits;

SRC: The Source Layer-2 ID field carries the identity of the source. It is set to the ProSe UE ID. The SRC field size is 24 bits;

DST: The DST field can be 16 bits or 24 bits. If it is 16 bits, it carries the 16 most significant bits of the Destination Layer-2 ID. If it is 24 bits, it is set to the Destination Layer-2 ID. For sidelink communication, the Destination Layer-2 ID is set to the ProSe Layer-2 Group ID or Prose UE ID. For V2X sidelink communication, the Destination Layer-2 ID is set to the identifier provided by upper layers as defined in [14]. If the V field is set to "0001", this identifier is a groupcast identifier. If the V field is set to "0010", this identifier is a unicast identifier;

LCID: The Logical Channel ID field uniquely identifies the logical channel instance within the scope of one Source Layer-2 ID and Destination Layer-2 ID pair of the corresponding MAC SDU or padding as described in table 6.2.4-1. There is one LCID field for each MAC SDU or padding included in the MAC PDU. In addition to that, one or two additional LCID fields are included in the MAC PDU, when single-byte or two-byte padding is required but cannot be achieved by padding at the end of the MAC PDU. The values of LCID from '01011' to '10100' identify the logical channels used to send duplicated RLC SDUs from logical channels of which the values of LCID from '00001' to '01010' respectively in sequential order. The LCID field size is 5 bits;

L: The Length field indicates the length of the corresponding MAC SDU in bytes. There is one L field per MAC PDU subheader except for the last subheader. The size of the L field is indicated by the F field;

F: The Format field indicates the size of the Length field as indicated in table 6.2.4-2. There is one F field per MAC PDU subheader except for the last subheader. The size of the F field is 1 bit. If the size of the MAC SDU is less than 128 bytes, the value of the F field is set to 0, otherwise it is set to 1;

E: The Extension field is a flag indicating if more fields are present in the MAC header or not. The E field is set to "1" to indicate another set of at least R/R/E/LCID fields. The E field is set to "0" to indicate that either a MAC SDU or padding starts at the next byte;

R: Reserved bit, set to "0".

The MAC header and subheaders are octet aligned.

Table 6.2.4-1 of 3GPP R2-1808916, Entitled "Values of LCID for SL-SCH", is Reproduced as FIG. 10

Table 6.2.4-2 of 3GPP R2-1808916, Entitled "Values of F Field", is Reproduced as FIG. 11

3GPP R2-1808921 introduces the following descriptions and concepts:

5.1.2.1.4 Procedures for DRBs Mapped on RLC AM, for LWA Bearers and SLRB when the Reordering Function is Used For DRBs mapped on RLC AM and for LWA bearers, the PDCP entity shall use the reordering function as specified in this section when:
- the PDCP entity is associated with two AM RLC entities; or
- the PDCP entity is configured for a LWA bearer; or
- the PDCP entity is associated with one AM RLC entity after it was, according to the most recent reconfiguration, associated with two AM RLC entities or configured for a LWA bearer without performing PDCP re-establishment.

For SLRBs mapped on RLC UM, the PDCP entity shall use the reordering function as specified in this section when:
- the PDCP entity is associated with two sidelink UM RLC entities;

The PDCP entity shall not use the reordering function in other cases.

5.1.2.1.4.1 Procedures when a PDCP PDU is Received from the Lower Layers

For DRBs mapped on RLC AM, SLRB for duplicated transmission and for LWA bearers, when the reordering function is used, at reception of a PDCP Data PDU from lower layers, the UE shall:

if received PDCP SN−Last_Submitted_PDCP_RX_SN>Reordering_Window or 0<=Last_Submitted_PDCP_RX_SN−received PDCP SN<Reordering_Window:
  if the PDCP PDU was received on WLAN:
    if received PDCP SN>Next_PDCP_RX_SN:
      for the purpose of setting the HRW field in the LWA status report, use COUNT based on RX_HFN−1 and the received PDCP SN;
    else:
      for the purpose of setting the HRW field in the LWA status report, use COUNT based on RX_HFN and the received PDCP SN;
  discard the PDCP PDU;
else if Next_PDCP_RX_SN−received PDCP SN>Reordering_Window:
  increment RX_HFN by one;
  use COUNT based on RX_HFN and the received PDCP SN for deciphering the PDCP PDU;
  set Next_PDCP_RX_SN to the received PDCP SN+1;
else if received PDCP SN−Next_PDCP_RX_SN>=Reordering_Window:
  use COUNT based on RX_HFN−1 and the received PDCP SN for deciphering the PDCP PDU;
else if received PDCP SN>=Next_PDCP_RX_SN:
  use COUNT based on RX_HFN and the received PDCP SN for deciphering the PDCP PDU;
  set Next_PDCP_RX_SN to the received PDCP SN+1;
  if Next_PDCP_RX_SN is larger than Maximum_PDCP_SN:
    set Next_PDCP_RX_SN to 0;
    increment RX_HFN by one;
else if received PDCP SN<Next_PDCP_RX_SN:
  use COUNT based on RX_HFN and the received PDCP SN for deciphering the PDCP PDU;
if the PDCP PDU has not been discarded in the above:
  if a PDCP SDU with the same PDCP SN is stored:
    discard the PDCP PDU;

else:
  perform deciphering of the PDCP PDU and store the resulting PDCP SDU;
  if received PDCP SN=Last_Submitted_PDCP_RX_SN+1 or received PDCP SN=Last_Submitted_PDCP_RX_SN−Maximum_PDCP_SN:
    deliver to upper layers in ascending order of the associated COUNT value:
      all stored PDCP SDU(s) with consecutively associated COUNT value(s) starting from the COUNT value associated with the received PDCP PDU;
    set Last_Submitted_PDCP_RX_SN to the PDCP SN of the last PDCP SDU delivered to upper layers;
  if t-Reordering is running:
    if the PDCP SDU with Reordering_PDCP_RX_COUNT−1 has been delivered to upper layers:
      stop and reset t-Reordering;
  if t-Reordering is not running (includes the case when t-Reordering is stopped due to actions above):
    if there is at least one stored PDCP SDU:
      start t-Reordering;
      set Reordering_PDCP_RX_COUNT to the COUNT value associated to RX_HFN and Next_PDCP_RX_SN.

[ . . . ]

5.1.3 SL Data Transmission Procedures
For Sidelink transmission, the UE shall follow the procedures in subclause 5.1.1 with following modifications:
  the requirements for maintaining Next_PDCP_TX_SN and TX_HFN are not applicable;
  determine a PDCP SN ensuring that a PDCP SN value is not reused with the same key;
  perform ciphering (if configured) as specified in subclause 5.6.1 and 5.6.2;
  perform the header compression (if configured) if SDU Type is set to 000, i.e. IP SDUs.
For sidelink duplication transmission capable UE, when PDCP duplication transmission is configured, for the SLRB with packets which have PPPR no lower than the configured PPPR threshold, the Sidelink transmission of UE shall follow the procedures in subclause 5.1.1 with following modifications compared to above Sidelink transmission procedure:
  the requirements for maintaining Next_PDCP_TX_SN and TX_HFN are applicable;
  the PDCP entity duplicates the PDCP PDUs, and delivers the PDCP PDUs to both RLC entities for transmission.

5.1.4 SL Data Reception Procedures
For Sidelink reception, the UE shall follow the procedures in subclause 5.1.2.1.3 with following modifications:
  the requirements for maintaining Next_PDCP_RX_SN and RX_HFN are not applicable;
  perform the deciphering (if configured) as specified in subclause 5.6.1 and 5.6.2;
  perform the header decompression (if configured) if SDU Type is set to 000, i.e. IP SDUs.
For sidelink duplication reception capable UE, if it detects PDCP duplication reception in duplication logical channel, or if it receives a PDCP SN which is not "0" from the non-duplication logical channel, the Sidelink reception of the UE shall follow the procedures in subclause 5.1.2.1.4.1 with following modifications compared to above Sidelink reception procedure:
  the requirements for maintaining Next_PDCP_RX_SN and RX_HFN are applicable;
  perform the re-ordering procedure as specified in subclause 5.1.2.1.4.1.

[ . . . ]

5.6.1 SL Ciphering and Deciphering for One-to-Many Communication
For SLRB used for one-to-many communication, the ciphering function includes both ciphering and deciphering and is performed in PDCP as defined in [13]. The data unit that is ciphered is the data part of the PDCP PDU (see subclause 6.3.3). The ciphering function as specified in [6] is applied with KEY (PEK), COUNT (derived from PTK Identity and PDCP SN as specified in [13]), BEARER and DIRECTION (set to 0) as input. The ciphering function is configured by ProSe Function.
If ciphering is configured, the ciphering algorithm and related parameters including PGK, PGK Identity, and Group Member Identity are configured to the UE by ProSe Key Management Function. The UE shall set PTK Identity based on PGK, PGK Identity, and PDCP SN as specified in [13]. The UE shall derive PTK from PGK using PTK Identity and Group Member Identity, and derive PEK from PTK using the ciphering algorithm. The PGK Index, PTK Identity, and PDCP SN are included in the PDCP PDU header.
If ciphering is not configured, PGK Index and PTK Identity shall be set to "0" in the PDCP PDU header.
If ciphering is not configured, and sidelink duplication transmission is disabled for the SLRB, PDCP SN shall be set to "0" in the PDCP PDU header.

5.6.2 SL Ciphering and Deciphering for One-to-One Communication
For SLRB used for one-to-one communication, the ciphering function includes both ciphering and deciphering and is performed in PDCP of SLRB that needs ciphering and deciphering as defined in [13]. The data unit that is ciphered is the data part of the PDCP PDU (see subclause 6.3.3). The ciphering function as specified in [6] is applied with KEY (PEK), COUNT (derived from $K_{D-sess}$ Identity and PDCP SN as specified in [13]), BEARER and DIRECTION (which value shall be set is specified in [13]) as input.
For the SLRB that needs ciphering and deciphering, the UE shall derive the KEY (PEK) based on $K_{D-sess}$ and the algorithms determined by the initiating UE and the receiving UE as specified in [13]. The $K_{D-sess}$ Identity and PDCP SN are included in the PDCP PDU header.
For the SLRB that does not need ciphering and deciphering, the UE shall set $K_{D-sess}$ Identity to "0" in the PDCP PDU header.
For the SLRB that does not need ciphering and deciphering, and sidelink duplication transmission is disabled, PDCP SN shall be set "0" in the PDCP PDU header.

[ . . . ]

b) t-Reordering
The duration of the timer is configured by upper layers [3] except for the case of SL PDCP duplication reception. For SL PDCP duplication transmission, the t-Reordering timer is generated by the UE. This timer is used to detect loss of PDCP PDUs as specified in the subclause 5.1.2.1.4. If t-Reordering is running, t-Reordering shall not be started additionally, i.e. only one t-Reordering per PDCP entity is running at a given time.

According to 3GPP R2-1809265, carrier aggregation (CA) in sidelink is supported for V2X (Vehicle-to-Everything) sidelink communication. It applies to both in coverage UEs and out of coverage UEs. In addition, sidelink packet duplication will be supported for V2X sidelink communication and may be performed at PDCP (Packet Data Convergence Protocol) layer of the UE. For sidelink packet duplication for transmission, a PDCP PDU (Protocol Data Unit) is duplicated at the PDCP entity. The duplicated PDCP PDUs of the same PDCP entity are submitted or delivered to two different RLC (Radio Link Control) entities and associated with two different sidelink logical channels respectively. The duplicated PDCP PDUs of the same PDCP entity are only allowed to be transmitted on different sidelink carriers. A UE can activate or deactivate sidelink packet duplication based on (pre)configuration. The PPPR (ProSe Per-Packet Reliability) value(s) for which sidelink packet duplication is supported can be (pre)configured via a PPPR threshold.

For UE autonomous resource selection and scheduled resource allocation, the UE shall perform sidelink packet duplication for the data with the configured PPPR value(s) until packet duplication is de-configured for these PPPR value(s). For scheduled resource allocation, the UE reports the amount of data associated with one or more PPPR values, and the destination(s) to which the data belongs via sidelink BSR(s) (Buffer Status Report). A mapping of PPPR values to logical channel groups can be configured by the eNB, and the PPPR value(s) are reflected by the associated logical channel group ID included in the sidelink BSR(s). A list of PPPR value(s) may be reported in Sidelink UE information by an RRC_CONNECTED UE.

For a UE using scheduled resource allocation, two non-overlapped sets of carriers are configured by the eNB per Destination reported by the UE to the network, and they apply to all the PPPR(s) that are configured for sidelink packet duplication. The UE then associates two duplicated sidelink logical channels corresponding to the same PDCP entity respectively with the two sets of carriers configured for the Destination of the two sidelink logical channels. The Destination could be an identity corresponding to one or more than one (receiving) UEs to which the (transmitting) UE perform sidelink communication transmission. The association between the duplicated sidelink logical channel and the carrier set is up to UE implementation. Data of a duplicated sidelink logical channel can only be transmitted on the carrier(s) in the associated carrier set.

Figure 12:
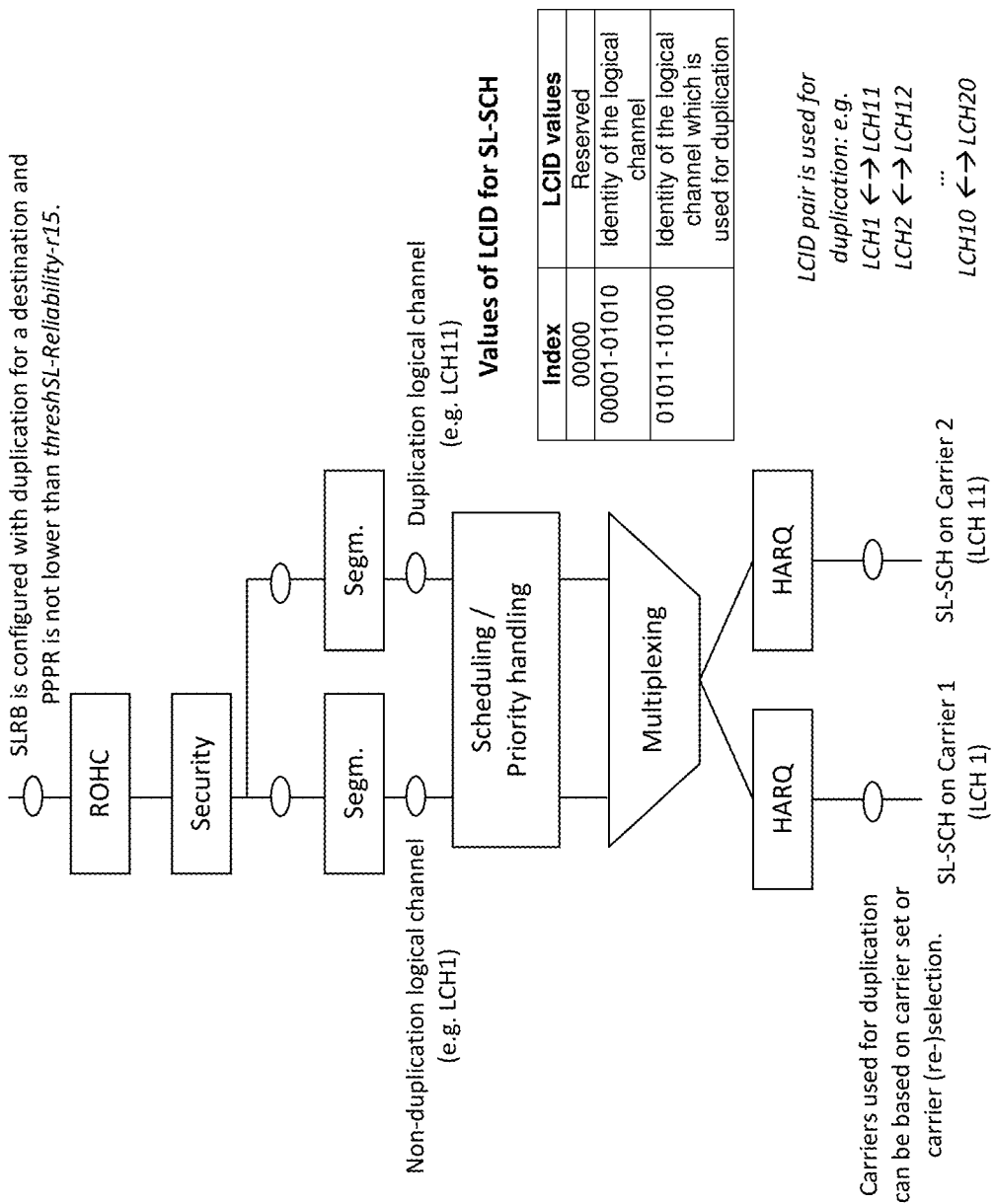
FIG. 12 is a diagram according to one exemplary embodiment.

FIG. 12 illustrates an example of transmission operation for sidelink packet duplication. A (transmitting) UE may have data available for transmission (for a destination) on a sidelink radio bearer (SLRB). The SLRB could be associated with a reliability (e.g. PPPR). The reliability may be lower than a threshold. The UE may perform sidelink packet duplication on the SLRB. The UE could duplicate a PDCP PDU. The UE could deliver the PDCP PDU and the duplicate of the PDCP PDU into two different RLC entities/layers associated with the SLRB. The UE could also deliver the PDCP PDU into a first RLC entity/layer associated with the SLRB. In addition, the UE could deliver the duplicate of the PDCP PDU into a second RLC entity/layer associated with the SLRB. The UE may be configured with sidelink packet duplication on the SLRB. The UE could maintain parameter(s) used for sidelink transmission on the SLRB. The parameter could be Next_PDCP_TX_SN. The parameter could be TX_HFN.

For the sidelink packet duplication, the UE may select a non-duplication logical channel from a first range (e.g. LCH1 to LCH10, '00001' to '01010', or etc). For the sidelink packet duplication, the UE may select a duplication logical channel from a second range (e.g. LCH11 to LCH20, '01011' to '10100', or etc). The values of the first range may identify the logical channels used to send duplicated RLC (Radio Link Control) SDUs (Service Data Units) from logical channels of which the values of the second range respectively in sequential order. In this example, the UE may use a first logical channel (e.g. LCH1) and a second logical channel (e.g. LCH11) for the sidelink packet duplication. The UE may use a first carrier (e.g. Carrier 1) to serve the first logical channel. The UE may also use a second carrier (e.g. Carrier 2) to serve the second logical channel.

Figure 13:
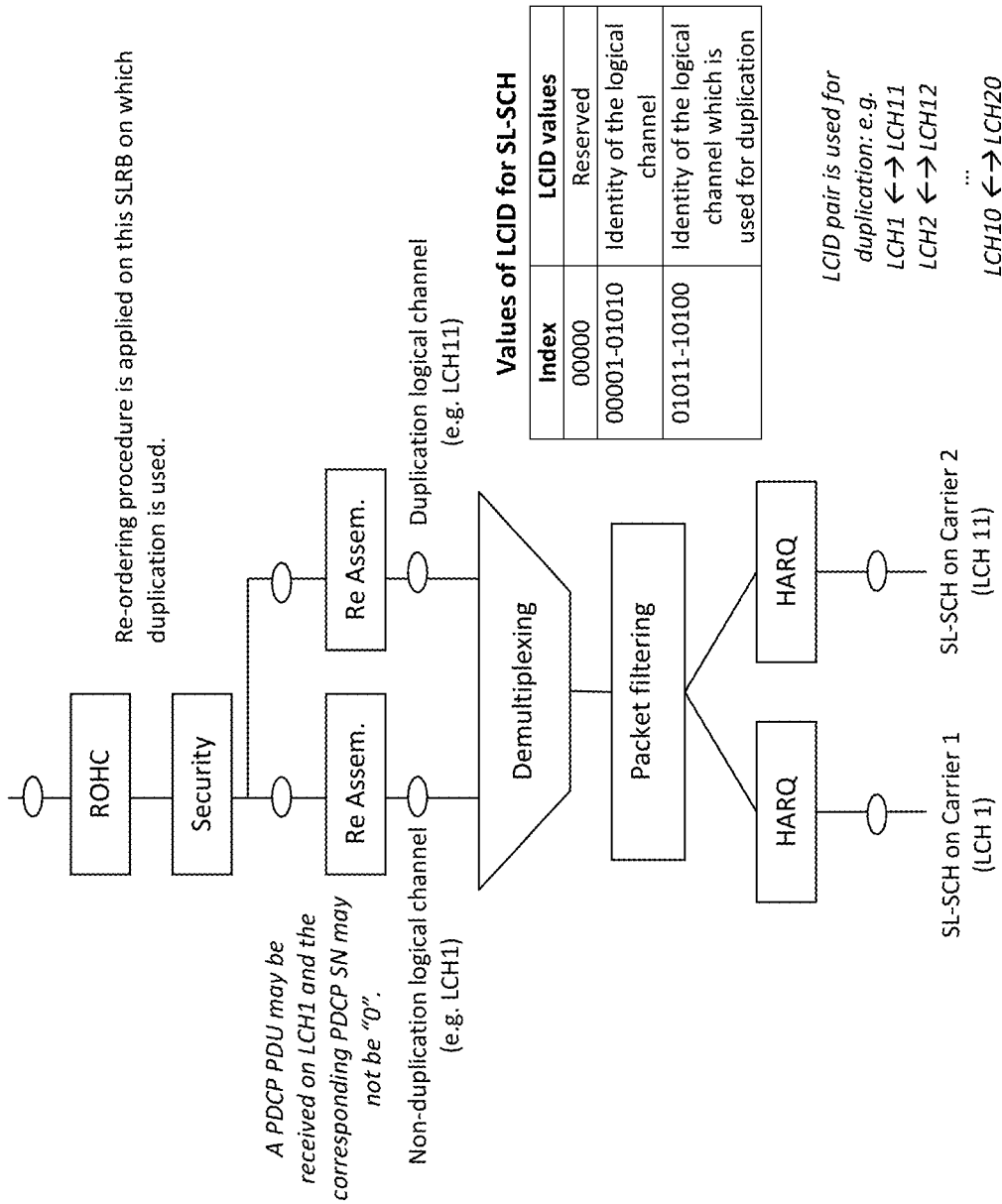
FIG. 13 is a diagram according to one exemplary embodiment.

FIG. 13 illustrates an example of reception operation for sidelink packet duplication. According to 3GPP R2-1808921, a (sidelink duplication reception capable) UE could detect PDCP duplication reception based on receiving traffic on duplication logical channel or receiving traffic associated with a PDCP SN which is not "0" from non-duplication logical channel. The traffic could be a PDCP PDU or a PDCP SDU. The UE may use a first carrier (e.g. Carrier 1) to serve the non-duplication logical channel. The UE may also use a second carrier (e.g. Carrier 2) to serve the duplication logical channel.

For an example, the UE may (first) receive a first traffic on a first logical channel (e.g. LCH1). The first traffic may be associated with a PDCP SN="1". In this situation, the UE could understand or determine to associate the first logical channel with a SLRB on which sidelink packet duplication will be performed. The UE may receive a first traffic on a second logical channel (e.g. LCH11). In this situation, the UE could understand or determine to associate the second logical channel with the SLRB and/or with the first logical channel (based on e.g. LCID pair). The content of the first traffic on the first logical channel may be the same as the content of the first traffic on the second logical channel. The first traffic on the second logical channel could be the duplicate of the first traffic on the first logical channel.

For another example, the (receiving) UE may (first) receive a second traffic on the second logical channel. In this situation, the UE could understand or determine to associate the second logical channel with a SLRB on which sidelink packet duplication will be performed. The UE may receive a second traffic on the first second logical channel. In this situation, the UE could understand or determine to associate the first logical channel with the SLRB and/or to associate the first logical channel with the second logical channel (based on e.g. LCID pair). The content of the second traffic on the first logical channel may be the same as the content of the second traffic on the second logical channel. The second traffic on the second logical channel could be the duplicate of the second traffic on the first logical channel.

The UE could maintain parameter(s) used for sidelink reception on the SLRB (if PDCP duplication reception is detected). The parameter could be Next_PDCP_RX_SN. The parameter could be RX_HFN. The UE could perform re-ordering procedure for the sidelink reception on the SLRB (if PDCP duplication reception is detected).

In one embodiment, the UE may first receive a PDCP PDU with SN=0 on the first logical channel. Based on 3GPP R2-1808921, the UE would deliver the resulting PDCP SDU of this PDCP PDU to upper layer but not maintain the parameter(s) (e.g. Next_PDCP_RX_SN and/or RX_HFN) used for sidelink reception on the SLRB. This could be because that (i) the UE could not understand (or determine or know) the PDCP PDU with SN=0 received on the first logical channel is a duplicate of the PDCP PDU, or (ii) the PDCP PDU with SN=0 received from the first logical channel is neither a PDCP PDU with SN not equal to non-zero nor a PDCP PDU received from the duplication logical channel. The UE could not store resulting PDCP SDU of the PDCP PDU with SN=0 received on the first logical channel.

When UE receives a PDCP PDU with SN=0 on the second logical channel, the UE could understand (or determine or know) the PDCP PDU received on the second logical channel is a duplicate of the PDCP PDU (with SN=0) received on the first logical channel, and would maintain the parameter(s) used for the sidelink reception on the SLRB. In this situation, the UE would deliver a resulting PDCP SDU of the duplicate of the PDCP PDU to the upper layer because there is no stored resulting PDCP SDU of the duplicate for the SLRB based on the (current) maintained parameter(s).

Figure 14:
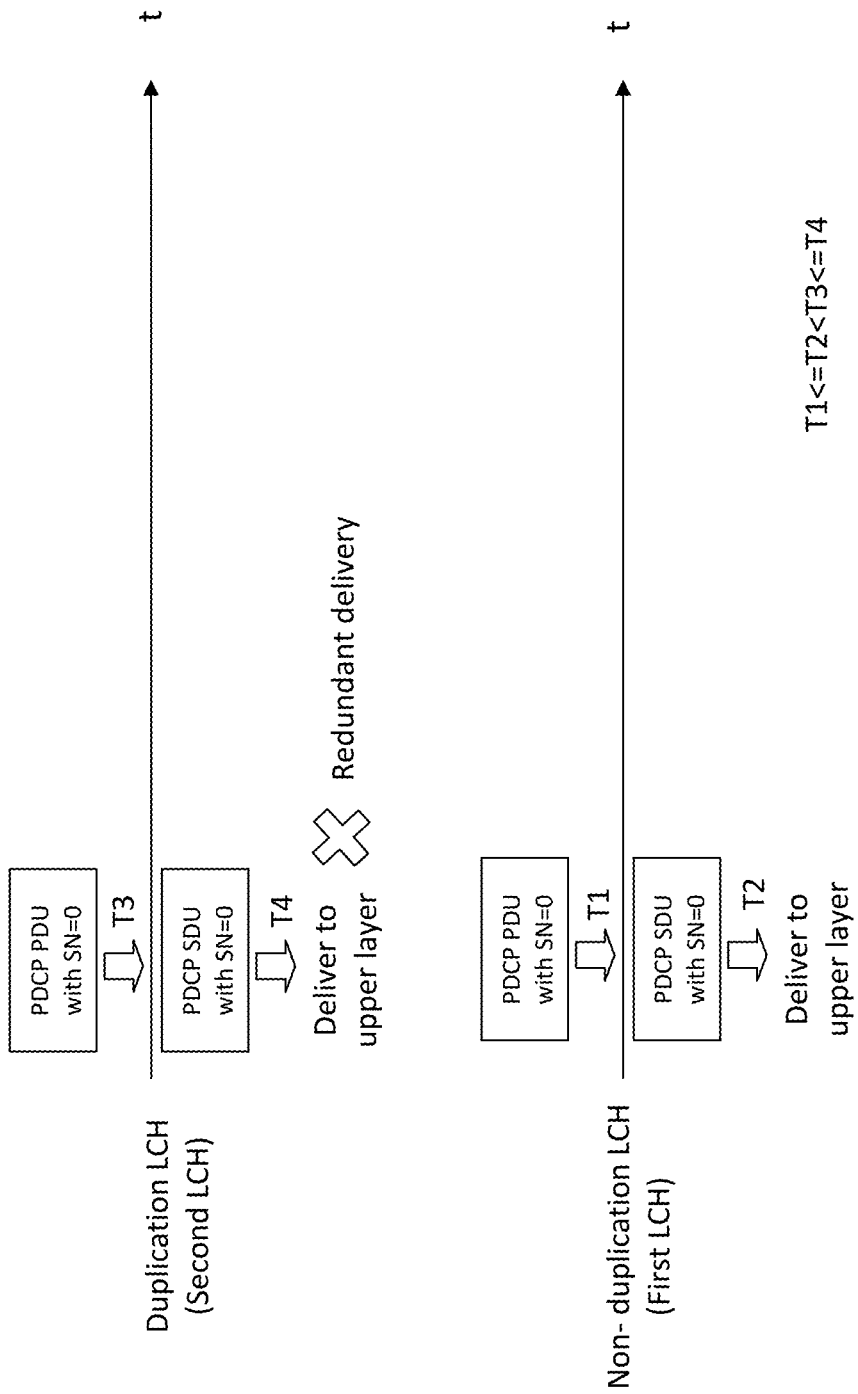
FIG. 14 is a diagram according to one exemplary embodiment.
Figure 15:
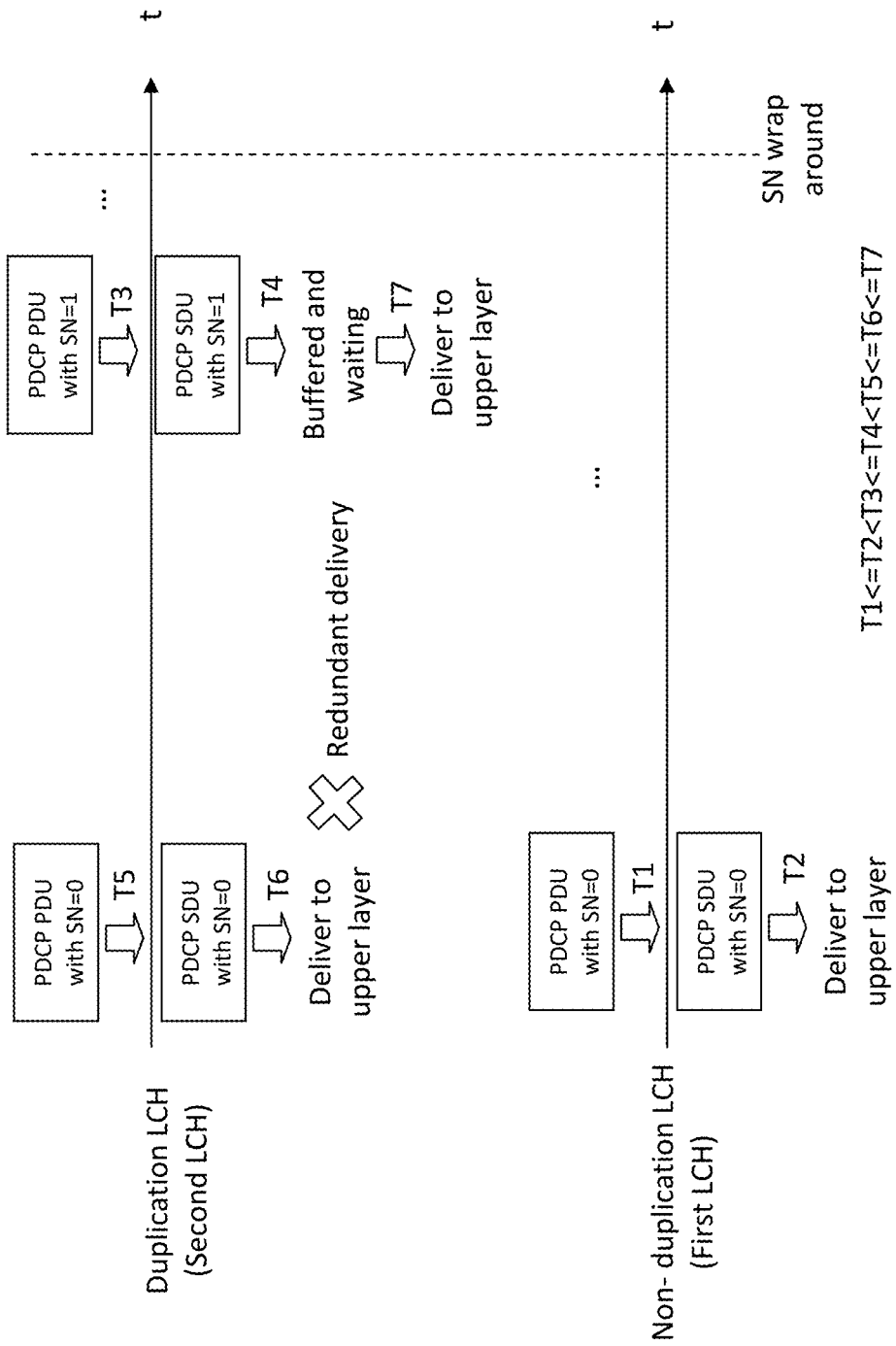
FIG. 15 is a diagram according to one exemplary embodiment.

For example, the UE could not maintain Next_PDCP_RX_SN and/or RX_HFN on the SLRB when the PDCP PDU with SN=0 is received on the first logical channel. The UE could deliver a PDCP SDU of the PDCP PDU with SN=0 received on the first logical channel to upper layer. The UE could not store the PDCP SDU of the PDCP PDU with SN=0 received on the first logical channel. When the PDCP PDU with SN=0 is received on the second logical channel, the UE could (start to) maintain Next_PDCP_RX_SN and/or RX_HFN on the SLRB. The Next_PDCP_RX_SN could be '0'. The RX_HFN could be '0'. Since the SN (='0') of the PDCP PDU received on the second logical channel equals to the Next_PDCP_RX_SN (='0'), the UE could consider there is no stored PDCP SDU of the PDCP PDU received on the second logical channel. The UE could store a PDCP SDU of the PDCP PDU received on the second logical channel. The UE could deliver a PDCP SDU of the PDCP PDU received on the second logical channel to the upper layer. Actually, the PDCP SDU of the PDCP PDU with SN=0 received on the first logical channel has been delivered to upper layers, and delivery of the PDCP SDU of the PDCP PDU with SN=0 received on the second logical channel seems not needed. The issue could be illustrated in FIGS. 14 and 15.

Since the sidelink packet duplication could be used for V2X sidelink communication, this situation would cause unexpected UE behaviour for receiving duplicates of the same V2X service information in view of upper layers (e.g. V2X applications). To avoid the penalties, some alternative may be addressed.

In one alternative, a SN of a (very first) PDCP SDU for transmission with sidelink packet duplication may be started from a specific number. The specific number could be larger than '0' (or could not be '0'). For example, the specific number could be '1'. The SN could be a PDCP SN.

In one embodiment, the (transmitting) UE could transmit the (very first) PDCP SDU with SN started from '1'. The (transmitting) UE could increment Next_PDCP_TX_SN by one (or by a number which is larger than '0') before associating the SN corresponding to the Next_PDCP_TX_SN to the (very first) PDCP SDU. The (transmitting) UE could also set Next_PDCP_TX_SN to non-zero (e.g. a number which is larger than '0') when a PDCP entity for the SLRB is established.

---

Text proposal on top of [5] for TS38.323 - Example 1-1

---

5.1.3 SL Data Transmission Procedures

For Sidelink transmission, the UE shall follow the procedures in subclause 5.1.1 with following modifications:

the requirements for maintaining Next_PDCP_TX_SN and TX_HFN are not applicable;

determine a PDCP SN ensuring that a PDCP SN value is not reused with the same key;

perform ciphering (if configured) as specified in subclause 5.6.1 and 5.6.2;

perform the header compression (if configured) if SDU Type is set to 000, i.e. IP SDUs.

For sidelink duplication transmission capable UE, when PDCP duplication transmission is configured, for the SLRB with packets which have PPPR no lower than the configured PPPR threshold, the Sidelink transmission of UE shall follow the procedures in subclause 5.1.1 with following modifications compared to above Sidelink transmission procedure:

the requirements for maintaining Next_PDCP_TX_SN and TX_HFN are applicable;

the Next_PDCP_TX_SN is initially set to 1;

the PDCP entity duplicates the PDCP PDUs, and delivers the PDCP PDUs to both RLC entities for transmission.

---

Text proposal on top of [5] for TS38.323 - Example 1-2

---

5.1.1 UL Data Transfer Procedures

At reception of a PDCP SDU from upper layers, the UE shall:

start the discardTimer associated with this PDCP SDU (if configured);

For a PDCP SDU received from upper layers, the UE shall:

if the PDCP SDU is received on the SLRB configured with PDCP duplication transmission and the SLRB with packets which have PPPR no lower than the configured PPPR threshold and the PDCP SDU is the very first PDCP SDU for this SLRB:

increment Next_PDCP_TX_SN by one;

associate the PDCP SN corresponding to Next_PDCP_TX_SN to this PDCP SDU;

NOTE: Associating more than half of the PDCP SN space of contiguous PDCP SDUs with PDCP SNs, when e.g., the PDCP SDUs are discarded or transmitted without acknowledgement, may cause HFN desynchronization problem. How to prevent HFN desynchronization problem is left up to UE implementation.

perform header compression of the PDCP SDU (if configured) as specified in the subclause 5.5.4;

perform integrity protection (if applicable), and ciphering (if applicable) using COUNT based on TX_HFN and the PDCP SN associated with this PDCP SDU as specified in the subclause 5.7 and 5.6, respectively;

increment Next_PDCP_TX_SN by one;

| Text proposal on top of [5] for TS38.323 - Example 1-2 |
| --- |
| if Next_PDCP_TX_SN > Maximum_PDCP_SN:<br>    set Next_PDCP_TX_SN to 0;<br>    increment TX_HFN by one;<br>    submit the resulting PDCP Data PDU to lower layer. |

| Text proposal on top of [5] for TS38.323 - Example 1-3 |
| --- |
| 7.1 State variables<br>This sub clause describes the state variables used in PDCP entities in order to specify the PDCP protocol.<br>All state variables are non-negative integers.<br>The transmitting side of each PDCP entity shall maintain the following state variables:<br>a) Next_PDCP_TX_SN<br>The variable Next_PDCP_TX_SN indicates the PDCP SN of the next PDCP SDU for a given PDCP entity. At establishment of the PDCP entity, the UE shall set Next_PDCP_TX_SN to 0.<br>For sidelink duplication transmission capable UE, when PDCP duplication transmission is configured, for the SLRB with packets which have PPPR no lower than the configured PPPR threshold, the UE shall initially set Next_PDCP_TX_SN to 1. |

Figure 16:
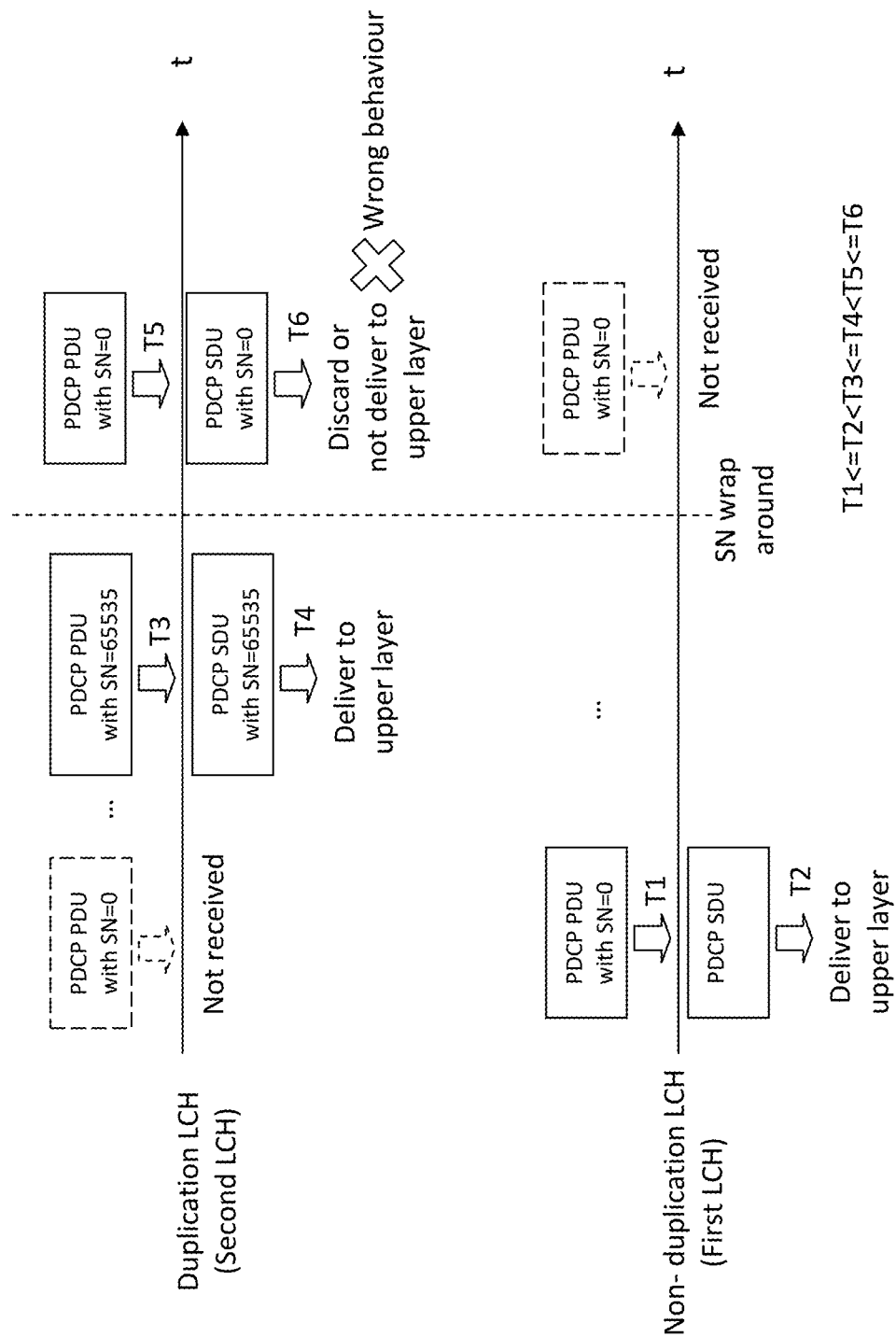
FIG. 16 is a diagram according to one exemplary embodiment.

In another alternative, the (receiving) UE could not deliver a PDCP SDU of a PDCP PDU with SN=0 received on a second logical channel to upper layer if a PDCP PDU with SN=0 has been received on a first logical channel. The first logical channel could be a non-duplication logical channel. The second logical channel could be a duplication logical channel. The duplication logical channel could be associated with the non-duplication logical channel. The PDCP PDU with SN=0 received on the first logical channel could be a very first PDCP PDU with SN=0 received on the first logical channel. The PDCP PDU with SN=0 received on the second logical channel could be a very first PDCP PDU with SN=0 received on the second logical channel. However, the very first PDCP PDU with SN=0 received on the second logical channel could be a PDCP PDU with SN=0 for which the SN could wrap around. If the UE follows this principle, the UE could not deliver the very first PDCP PDU with SN=0 received on the second logical channel. This situation could be illustrated in FIG. 16.

In one embodiment, the UE could not maintain parameter(s) used for sidelink reception after receiving the PDCP PDU with SN=0 on the first logical channel. For example, the UE could not set the parameter(s) used for sidelink reception to '0' before receiving the PDCP PDU with SN=0 on the first logical channel. Furthermore, the UE could not set the parameter(s) used for sidelink reception based on the SN of the PDCP PDU after receiving the PDCP PDU with SN=0 on the first logical channel.

In one embodiment, the UE could store a PDCP SDU of the PDCP PDU with SN=0 received on the first logical channel after receiving this PDCP PDU on the first logical channel. The UE could deliver the PDCP SDU with SN=0 received on the first logical channel to upper layer.

In one embodiment, the UE could not maintain parameter(s) used for sidelink reception upon reception of the PDCP PDU with SN=0 on the first logical channel. For example, the UE could not set the parameter(s) used for sidelink reception based on the SN of the PDCP PDU upon reception of the PDCP PDU with SN=0 on the first logical channel.

In one embodiment, the UE could store a PDCP SDU of the PDCP PDU with SN=0 received on the first logical channel upon reception of this PDCP PDU on the first logical channel. The UE could deliver the PDCP SDU with SN=0 received on the first logical channel to upper layer.

In one embodiment, the UE could not maintain parameter(s) used for sidelink reception when the PDCP PDU with SN=0 is received on the first logical channel. For example, the UE could not set the parameter(s) used for sidelink reception based on the SN of the PDCP PDU when the PDCP PDU with SN=0 is received on the first logical channel.

In one embodiment, the UE could store a PDCP SDU of the PDCP PDU with SN=0 received on the first logical channel when this PDCP PDU is received on the first logical channel. The UE could deliver the PDCP SDU with SN=0 received on the first logical channel to upper layer.

In one embodiment, the UE could not maintain parameter(s) used for sidelink reception before receiving the PDCP PDU with SN=0 on the second logical channel. For example, the UE could not set the parameter(s) used for sidelink reception based on the SN of the PDCP PDU before receiving the PDCP PDU with SN=0 on the second logical channel.

In one embodiment, the UE could maintain parameter(s) used for sidelink reception after receiving the PDCP PDU with SN=0 on the second logical channel. For example, the UE could set the parameter(s) used for sidelink reception based on the SN of the PDCP PDU after receiving the PDCP PDU with SN=0 on the second logical channel.

In one embodiment, the UE could not store a PDCP SDU of the PDCP PDU with SN=0 received on the second logical channel after receiving this PDCP PDU on the second logical channel. The UE could discard the PDCP SDU with SN=0 received on the second logical channel (before the parameter(s) used for sidelink reception could wrap around) if no PDCP SDU except for the PDCP SDU with SN=0 has been received on the first logical channel (and/or the second logical channel) or delivered to upper layer (before the parameter(s) used for sidelink reception could wrap around). The UE could also discard a PDCP PDU containing the PDCP SDU with SN=0 received on the second logical channel (before the parameter(s) used for sidelink reception could wrap around) if no PDCP PDU except for a PDCP PDU with SN=0 has been received on the first logical channel (and/or the second logical channel) (before the parameter(s) used for sidelink reception could wrap around).

In addition, the UE could discard the PDCP SDU with SN=0 received on the second logical channel if this PDCP SDU is a very first PDCP SDU with SN=0 received on the second logical channel (before the parameter(s) used for sidelink reception could wrap around) and a PDCP SDU with SN=0 received on the first logical channel has been delivered to upper layer (before the parameter(s) used for sidelink reception could wrap around). Furthermore, the UE could discard the PDCP PDU with SN=0 received on the second logical channel if this PDCP PDU is a very first PDCP PDU with SN=0 received on the second logical channel (before the parameter(s) used for sidelink reception could wrap around) and a PDCP PDU with SN=0 has been received on the first logical channel (before the parameter(s) used for sidelink reception could wrap around).

In one embodiment, the UE could maintain parameter(s) used for sidelink reception upon reception of the PDCP PDU with SN=0 on the second logical channel. For example, the UE could set the parameter(s) used for sidelink reception based on the SN of the PDCP PDU upon reception of the PDCP PDU with SN=0 on the second logical channel.

In one embodiment, the UE could not store a PDCP SDU of the PDCP PDU with SN=0 received on the second logical channel upon reception of this PDCP PDU on the second logical channel. The UE could discard the PDCP SDU with SN=0 received on the second logical channel (before the parameter(s) used for sidelink reception could wrap around) if no PDCP SDU except for the PDCP SDU with SN=0 has been received on the first logical channel (and/or the second logical channel) or delivered to upper layer (before the parameter(s) used for sidelink reception could wrap around). The UE could also discard a PDCP PDU containing the PDCP SDU with SN=0 received on the second logical channel (before the parameter(s) used for sidelink reception could wrap around) if no PDCP PDU except for a PDCP PDU with SN=0 has been received on the first logical channel (and/or the second logical channel) (before the parameter(s) used for sidelink reception could wrap around). Furthermore, the UE could discard the PDCP SDU with SN=0 received on the second logical channel if this PDCP SDU is a very first PDCP SDU with SN=0 received on the second logical channel (before the parameter(s) used for sidelink reception could wrap around) and a PDCP SDU with SN=0 received on the first logical channel has been delivered to upper layer (before the parameter(s) used for sidelink reception could wrap around). In addition, the UE could discard the PDCP PDU with SN=0 received on the second logical channel if this PDCP PDU is a very first PDCP PDU with SN=0 received on the second logical channel (before the parameter(s) used for sidelink reception could wrap around) and a PDCP PDU with SN=0 has been received on the first logical channel (before the parameter(s) used for sidelink reception could wrap around).

In one embodiment, the parameter(s) used for sidelink reception could be Next_PDCP_RX_SN or RX_HFN.

In another alternative, the (receiving) UE could not deliver a PDCP SDU with SN=0 received on a second logical channel to upper layer if a PDCP SDU with SN=0 has been received on a first logical channel. The first logical channel could be a non-duplication logical channel. The second logical channel could be a duplication logical channel. The duplication logical channel could be associated with the non-duplication logical channel. The PDCP SDU with SN=0 received on the first logical channel could be a very first PDCP SDU with SN=0 received on the first logical channel. The PDCP SDU with SN=0 received on the second logical channel could be a very first PDCP SDU with SN=0 received on the second logical channel. However, the very first PDCP PDU with SN=0 received on the second logical channel could be a PDCP PDU with SN=0 for which the SN could wrap around. If the UE follows this principle, the UE could not deliver the very first PDCP PDU with SN=0 received on the second logical channel. This situation could be illustrated in FIG. 16.

In one embodiment, the UE could not maintain parameter(s) used for sidelink reception after receiving the PDCP SDU with SN=0 on the first logical channel. For example, the UE could not set the parameter(s) used for sidelink reception based on the SN of the PDCP SDU after receiving the PDCP SDU with SN=0 on the first logical channel.

In one embodiment, the UE could store the PDCP SDU with SN=0 received on the first logical channel after receiving this PDCP SDU on the first logical channel. The UE could deliver the PDCP SDU with SN=0 received on the first logical channel to upper layer.

In one embodiment, the UE could not maintain parameter(s) used for sidelink reception upon reception of the PDCP SDU with SN=0 on the first logical channel. For example, the UE could not set the parameter(s) used for sidelink reception based on the SN of the PDCP SDU upon reception of the PDCP SDU with SN=0 on the first logical channel.

In one embodiment, the UE could store the PDCP SDU with SN=0 received on the first logical channel upon reception of this PDCP SDU on the first logical channel. The UE could deliver the PDCP SDU with SN=0 received on the first logical channel to upper layer.

In one embodiment, the UE could not maintain parameter(s) used for sidelink reception before receiving the PDCP SDU with SN=0 on the second logical channel. For example, the UE could not set the parameter(s) used for sidelink reception based on the SN of the PDCP SDU before receiving the PDCP SDU with SN=0 on the second logical channel.

In one embodiment, the UE could maintain parameter(s) used for sidelink reception after receiving the PDCP SDU with SN=0 on the second logical channel. For example, the UE could set the parameter(s) used for sidelink reception based on the SN of the PDCP SDU after receiving the PDCP SDU with SN=0 on the second logical channel.

In one embodiment, the UE could not store the PDCP SDU with SN=0 received on the second logical channel after receiving this PDCP SDU on the second logical channel. The UE could discard the PDCP SDU with SN=0 received on the second logical channel (before the parameter(s) used for sidelink reception could wrap around) if no PDCP SDU except for the PDCP SDU with SN=0 has been received on the first logical channel (and/or the second logical channel) or delivered to upper layer (before the parameter(s) used for sidelink reception could wrap around). The UE could also discard a PDCP PDU containing the PDCP SDU with SN=0 received on the second logical channel (before the parameter(s) used for sidelink reception could wrap around) if no PDCP PDU except for a PDCP PDU with SN=0 has been received on the first logical channel (and/or the second logical channel) (before the parameter(s) used for sidelink reception could wrap around). Furthermore, the UE could discard the PDCP SDU with SN=0 received on the second logical channel if this PDCP SDU is a very first PDCP SDU with SN=0 received on the second logical channel (before the parameter(s) used for sidelink reception could wrap around) and a PDCP SDU with SN=0 received on the first logical channel has been delivered to upper layer (before the parameter(s) used for sidelink reception could wrap around). In addition, the UE could discard the PDCP PDU with SN=0 received on the second logical channel if this PDCP PDU is a very first PDCP PDU with SN=0 received on the second logical channel (before the parameter(s) used for sidelink reception could wrap around) and a PDCP PDU with SN=0 has been received on the first logical channel (before the parameter(s) used for sidelink reception could wrap around).

In one embodiment, the UE could maintain parameter(s) used for sidelink reception upon reception of the PDCP SDU with SN=0 on the second logical channel. For example, the UE could set the parameter(s) used for sidelink reception based on the SN of the PDCP SDU upon reception of the PDCP SDU with SN=0 on the second logical channel.

In one embodiment, the UE could not store the PDCP SDU with SN=0 received on the second logical channel upon reception of this PDCP SDU on the second logical channel. The UE could discard the PDCP SDU with SN=0 received on the second logical channel (before the parameter(s) used for sidelink reception could wrap around) if no PDCP SDU except for the PDCP SDU with SN=0 has been received on the first logical channel (and/or the second logical channel) or delivered to upper layer (before the parameter(s) used for sidelink reception could wrap around). The UE could also discard a PDCP PDU containing the PDCP SDU with SN=0 received on the second logical channel (before the parameter(s) used for sidelink reception could wrap around) if no PDCP PDU except for a PDCP PDU with SN=0 has been received on the first logical channel (and/or the second logical channel) (before the parameter(s) used for sidelink reception could wrap around). Furthermore, the UE could discard the PDCP SDU with SN=0 received on the second logical channel if this PDCP SDU is a very first PDCP SDU with SN=0 received on the second logical channel (before the parameter(s) used for sidelink reception could wrap around) and a PDCP SDU with SN=0 received on the first logical channel has been delivered to upper layer (before the parameter(s) used for sidelink reception could wrap around). In addition, the UE could discard the PDCP PDU with SN=0 received on the second logical channel if this PDCP PDU is a very first PDCP PDU with SN=0 received on the second logical channel (before the parameter(s) used for sidelink reception could wrap around) and a PDCP PDU with SN=0 has been received on the first logical channel (before the parameter(s) used for sidelink reception could wrap around).

In one embodiment, the parameter(s) used for sidelink reception could be Next_PDCP_RX_SN, RX_HFN, Last_Submitted_PDCP_RX_SN, or COUNT.

Figure 17:
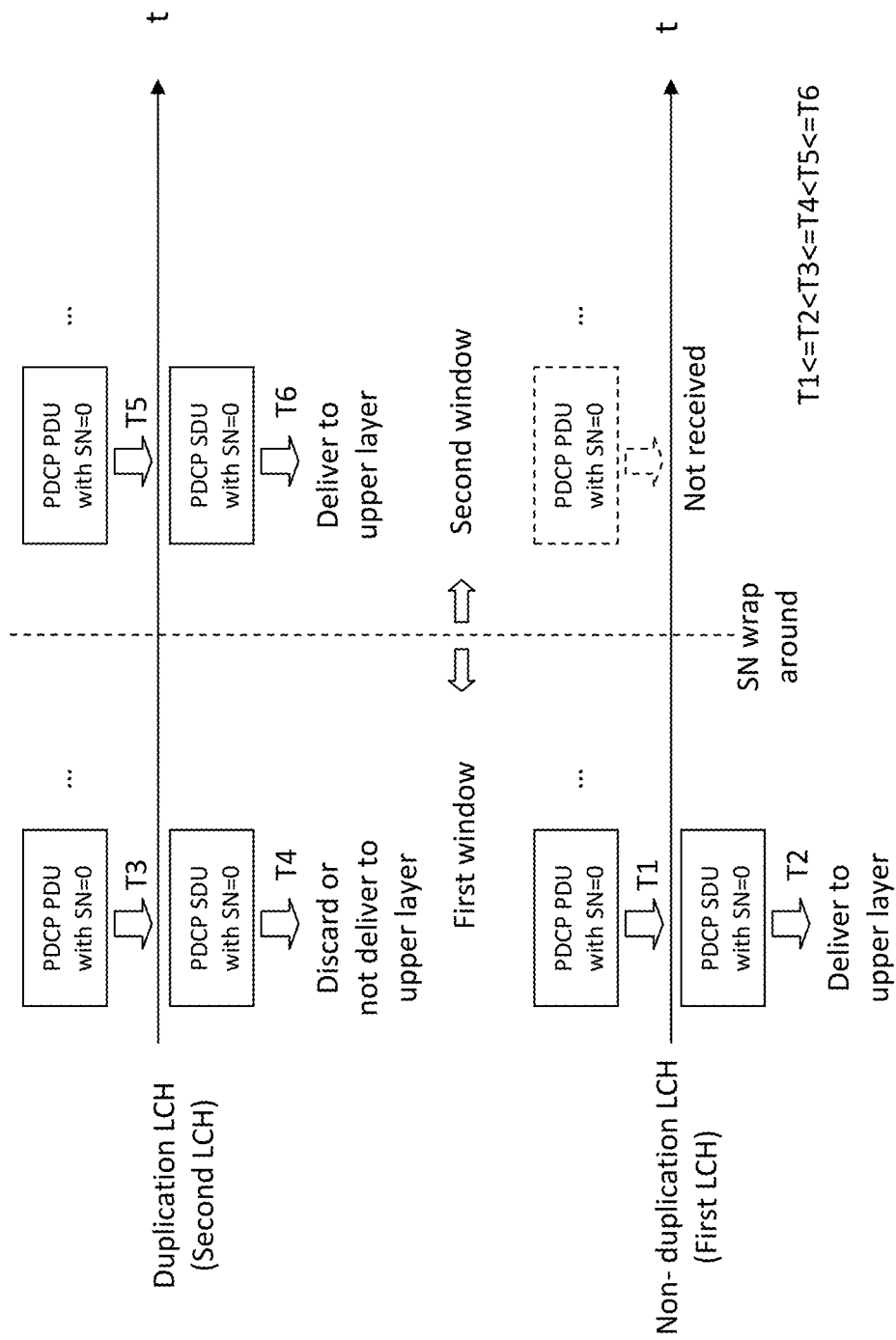
FIG. 17 is a diagram according to one exemplary embodiment.

In one embodiment, the parameter(s) used for sidelink reception could be a window used to determine if it is first time to receive a PDCP SDU with SN=0 within the window. For example, the UE could receive a PDCP SDU with SN=0 on the first logical channel within a first window. The UE could receive a PDCP SDU with SN=0 on the second logical channel. If the PDCP SDU with SN=0 is received on the second logical channel within the first window, the UE could discard this PDCP SDU (and not deliver this PDCP SDU to upper layer). If the PDCP SDU with SN=0 is received on the second logical channel within a second window, the UE could not discard this PDCP SDU (and deliver this PDCP SDU to upper layer). The first window could be followed by the second window. The size/length of the first/second window could be based on the size of PDCP SN, e.g. the half size of PDCP SN. The size/length of the first/second window could also be based on Reordering_Window. The parameter(s) used for sidelink reception warping around could mean changing from the first window to the second window. This solution could be illustrated in FIG. 17.

In one embodiment, the parameter(s) used for sidelink reception warping around could mean that the parameter(s) used for sidelink reception's value of $2^X-1$ (i.e. 2^X−1) could be less than the parameter(s) used for sidelink reception's value of '0', where X could be the size/length of the parameter(s) used for sidelink reception.

---

Text proposal on top of [5] for TS38.323 - Example 2-1

5.1.2.1.4.1 Procedures when a PDCP PDU is received from the lower layers
For DRBs mapped on RLC AM, SLRB for duplicated transmission and for LWA bearers, when the reordering function is used, at reception of a PDCP Data PDU from lower layers, the UE shall:
. . .
    else if received PDCP SN >= Next_PDCP_RX_SN:
        use COUNT based on RX_HFN and the received PDCP SN for deciphering the PDCP
        PDU;
        set Next_PDCP_RX_SN to the received PDCP SN + 1;
        if Next_PDCP_RX_SN is larger than Maximum_PDCP_SN:
            set Next_PDCP_RX_SN to 0;
            increment RX_HFN by one;
. . .
    if the PDCP PDU has not been discarded in the above:
        if the PDCP PDU with SN = 0 is received on the duplication logical channel and no
        PDCP SDU except for the PDCP SDU with SN = 0 received on the associated non-
        duplication logical channel has been delivered to upper layers:
            discard the PDCP PDU;
        if a PDCP SDU with the same PDCP SN is stored:
            discard the PDCP PDU;
        else:
            perform deciphering of the PDCP PDU and store the resulting PDCP SDU;
        if received PDCP SN = Last_Submitted_PDCP_RX_SN + 1 or received PDCP SN =
        Last_Submitted_PDCP_RX_SN − Maximum_PDCP_SN:
            deliver to upper layers in ascending order of the associated COUNT value:
                all stored PDCP SDU(s) with consecutively associated COUNT value(s) starting
                from the COUNT value associated with the received PDCP PDU;
            set Last_Submitted_PDCP_RX_SN to the PDCP SN of the last PDCP SDU
            delivered to upper layers;

Text proposal on top of [5] for TS38.323 - Example 2-2

5.1.2.1.4.1 Procedures when a PDCP PDU is received from the lower layers
For DRBs mapped on RLC AM, SLRB for duplicated transmission and for LWA bearers, when the reordering function is used, at reception of a PDCP Data PDU from lower layers, the UE shall:

. . .
    else if received PDCP SN >= Next_PDCP_RX_SN:
        use COUNT based on RX_HFN and the received PDCP SN for deciphering the PDCP PDU;
        set Next_PDCP_RX_SN to the received PDCP SN + 1;
        if Next_PDCP_RX_SN is larger than Maximum_PDCP_SN:
            set Next_PDCP_RX_SN to 0;
            increment RX_HFN by one;
. . .
    if the PDCP PDU has not been discarded in the above:
        if a PDCP SDU with the same PDCP SN is stored; or
        if the PDCP PDU with SN = 0 is received on the duplication logical channel and no PDCP SDU except for the PDCP SDU with SN = 0 received on the associated non-duplication logical channel has been delivered to upper layers:
            discard the PDCP PDU;
        else:
            perform deciphering of the PDCP PDU and store the resulting PDCP SDU;
        if received PDCP SN = Last_Submitted_PDCP_RX_SN + 1 or received PDCP SN = Last_Submitted_PDCP_RX_SN – Maximum_PDCP_SN:
            deliver to upper layers in ascending order of the associated COUNT value:
                all stored PDCP SDU(s) with consecutively associated COUNT value(s) starting from the COUNT value associated with the received PDCP PDU;
            set Last_Submitted_PDCP_RX_SN to the PDCP SN of the last PDCP SDU delivered to upper layers;

---

Text proposal on top of [5] for TS38.323 - Example 2-3

5.1.2.1.4.1 Procedures when a PDCP PDU is received from the lower layers
For DRBs mapped on RLC AM, SLRB for duplicated transmission and for LWA bearers, when the reordering function is used, at reception of a PDCP Data PDU from lower layers, the UE shall:

. . .
    else if received PDCP SN >= Next_PDCP_RX_SN:
        use COUNT based on RX_HFN and the received PDCP SN for deciphering the PDCP PDU;
        set Next_PDCP_RX_SN to the received PDCP SN + 1;
        if Next_PDCP_RX_SN is larger than Maximum_PDCP_SN:
            set Next_PDCP_RX_SN to 0;
            increment RX_HFN by one;
. . .
    if the PDCP PDU has not been discarded in the above:
        if the PDCP PDU with SN = 0 is received on the duplication logical channel and no PDCP PDU except for the PDCP PDU with SN = 0 has been received on the associated non-duplication logical channel:
            discard the PDCP PDU;
        if a PDCP SDU with the same PDCP SN is stored:
            discard the PDCP PDU;
        else:
            perform deciphering of the PDCP PDU and store the resulting PDCP SDU;
        if received PDCP SN = Last_Submitted_PDCP_RX_SN + 1 or received PDCP SN = Last_Submitted_PDCP_RX_SN – Maximum_PDCP_SN:
            deliver to upper layers in ascending order of the associated COUNT value:
                all stored PDCP SDU(s) with consecutively associated COUNT value(s) starting from the COUNT value associated with the received PDCP PDU;
            set Last_Submitted_PDCP_RX_SN to the PDCP SN of the last PDCP SDU delivered to upper layers;

| Text proposal on top of [5] for TS38.323 - Example 2-4 |

5.1.2.1.4.1 Procedures when a PDCP PDU is received from the lower layers
For DRBs mapped on RLC AM, SLRB for duplicated transmission and for LWA bearers, when the reordering function is used, at reception of a PDCP Data PDU from lower layers, the UE shall:
. . .
    else if received PDCP SN >= Next_PDCP_RX_SN:
        use COUNT based on RX_HFN and the received PDCP SN for deciphering the PDCP PDU;
        set Next_PDCP_RX_SN to the received PDCP SN + 1;
        if Next_PDCP_RX_SN is larger than Maximum_PDCP_SN:
            set Next_PDCP_RX_SN to 0;
            increment RX_HFN by one;
. . .
    if the PDCP PDU has not been discarded in the above:
        if a PDCP SDU with the same PDCP SN is stored; or
        if the PDCP PDU with SN = 0 is received on the duplication logical channel and no PDCP PDU except for the PDCP PDU with SN = 0 has been received on the associated non-duplication logical channel:
            discard the PDCP PDU;
        else:
            perform deciphering of the PDCP PDU and store the resulting PDCP SDU;
        if received PDCP SN = Last_Submitted_PDCP_RX_SN + 1 or received PDCP SN = Last_Submitted_PDCP_RX_SN − Maximum_PDCP_SN:
            deliver to upper layers in ascending order of the associated COUNT value:
                all stored PDCP SDU(s) with consecutively associated COUNT value(s) starting from the COUNT value associated with the received PDCP PDU;
            set Last_Submitted_PDCP_RX_SN to the PDCP SN of the last PDCP SDU delivered to upper layers;

| Text proposal on top of [5] for TS38.323 - Example 2-5 |

5.1.2.1.4.1 Procedures when a PDCP PDU is received from the lower layers
For DRBs mapped on RLC AM, SLRB for duplicated transmission and for LWA bearers, when the reordering function is used, at reception of a PDCP Data PDU from lower layers, the UE shall:
. . .
    else if received PDCP SN >= Next_PDCP_RX_SN:
        use COUNT based on RX_HFN and the received PDCP SN for deciphering the PDCP PDU;
        set Next_PDCP_RX_SN to the received PDCP SN + 1;
        if Next_PDCP_RX_SN is larger than Maximum_PDCP_SN:
            set Next_PDCP_RX_SN to 0;
            increment RX_HFN by one;
. . .
    if the PDCP PDU has not been discarded in the above:
        if a PDCP SDU with the same PDCP SN is stored:
            discard the PDCP PDU;
        else:
            perform deciphering of the PDCP PDU and store the resulting PDCP SDU;
        if received PDCP SN = Last_Submitted_PDCP_RX_SN + 1 or received PDCP SN = Last_Submitted_PDCP_RX_SN − Maximum_PDCP_SN:
            deliver to upper layers in ascending order of the associated COUNT value:
                all stored PDCP SDU(s) with consecutively associated COUNT value(s) starting from the COUNT value associated with the received PDCP PDU, except for the PDCP SDU with SN = 0 if this PDCP SDU is received on the duplication logical channel and no PDCP SDU except for the PDCP SDU with SN = 0 received on the associated non-duplication logical channel has been delivered to upper layers;
            set Last_Submitted_PDCP_RX_SN to the PDCP SN of the last PDCP SDU delivered to upper layers;

| Text proposal on top of [5] for TS38.323 - Example 2-6 |

5.1.2.1.4.1 Procedures when a PDCP PDU is received from the lower layers
For DRBs mapped on REC AM, SLRB for duplicated transmission and for LWA bearers, when the reordering function is used, at reception of a PDCP Data PDU from lower layers, the UE shall:
. . .
    else if received PDCP SN >= Next_PDCP_RX_SN:
        use COUNT based on RX_HFN and the received PDCP SN for deciphering the PDCP PDU;
        set Next_PDCP_RX_SN to the received PDCP SN + 1;
        if Next_PDCP_RX_SN is larger than Maximum_PDCP_SN:

| Text proposal on top of [5] for TS38.323 - Example 2-6 |
|---|
|        set Next_PDCP_RX_SN to 0;<br>       increment RX_HFN by one;<br>. . .<br>  if the PDCP PDU has not been discarded in the above:<br>    if a PDCP SDU with the same PDCP SN is stored:<br>      discard the PDCP PDU;<br>    else:<br>      perform deciphering of the PDCP PDU and store the resulting PDCP SDU;<br>    if received PDCP SN = Last_Submitted_PDCP_RX_SN + 1 or received PDCP SN =<br>    Last_Submitted_PDCP_RX_SN − Maximum_PDCP_SN:<br>      deliver to upper layers in ascending order of the associated COUNT value:<br>        all stored PDCP SDU(s) with consecutively associated COUNT value(s) starting<br>        from the COUNT value associated with the received PDCP PDU, except for the<br>        PDCP SDU with SN = 0 if this PDCP SDU is received on the duplication logical<br>        channel and no PDCP SDU except for the PDCP SDU with SN = 0 has been<br>        received on the associated non-duplication logical channel;<br>      set Last_Submitted_PDCP_RX_SN to the PDCP SN of the last PDCP SDU<br>      delivered to upper layers; |

20

| Text proposal on top of [5] for TS38.323 - Example 2-7 |
|---|

5.1.2.1.4.1 Procedures when a PDCP PDU is received from the lower layers
For DRBs mapped on RLC AM, SLRB for duplicated transmission and for LWA bearers, when the reordering function is used, at reception of a PDCP Data PDU from lower layers, the UE shall:
. . .
  else if received PDCP SN >= Next_PDCP_RX_SN:
    use COUNT based on RX_HFN and the received PDCP SN for deciphering the PDCP
    PDU;
    set Next_PDCP_RX_SN to the received PDCP SN + 1;
    if Next_PDCP_RX_SN is larger than Maximum_PDCP_SN:
      set Next_PDCP_RX_SN to 0;
      increment RX_HFN by one;
. . .
  if the PDCP PDU has not been discarded in the above:
    if the PDCP PDU is the very first PDCP PDU with SN = 0 received on the duplication
    logical channel before Next_PDCP_RX_SN wraps around and the PDCP SDU with SN =
    0 received on the associated non-duplication logical channel has been delivered to
    upper layers:
      discard the PDCP PDU;
    if a PDCP SDU with the same PDCP SN is stored:
      discard the PDCP PDU;
    else:
      perform deciphering of the PDCP PDU and store the resulting PDCP SDU;
    if received PDCP SN = Last_Submitted_PDCP_RX_SN + 1 or received PDCP SN =
    Last_Submitted_PDCP_RX_SN − Maximum_PDCP_SN:
      deliver to upper layers in ascending order of the associated COUNT value:
        all stored PDCP SDU(s) with consecutively associated COUNT value(s) starting
        from the COUNT value associated with the received PDCP PDU;
      set Last_Submitted_PDCP_RX_SN to the PDCP SN of the last PDCP SDU
      delivered to upper layers;

| Text proposal on top of [5] for TS38.323 - Example 2-8 |
|---|

5.1.2.1.4.1 Procedures when a PDCP PDU is received from the lower layers

For DRBs mapped on RLC AM, SLRB for duplicated transmission and for LWA bearers, when the reordering function is used, at reception of a PDCP Data PDU from lower layers, the UE shall:
. . .
  else if received PDCP SN >= Next_PDCP_RX_SN:
    use COUNT based on RX_HFN and the received PDCP SN for deciphering the PDCP
    PDU;

Text proposal on top of [5] for TS38.323 - Example 2-8

```
        set Next_PDCP_RX_SN to the received PDCP SN + 1;
        if Next_PDCP_RX_SN is larger than Maximum_PDCP_SN:
            set Next_PDCP_RX_SN to 0;
            increment RX_HFN by one;
. . .
    if the PDCP PDU has not been discarded in the above:
        if the PDCP PDU is the very first PDCP PDU with SN = 0 received on the duplication
        logical channel before Next_PDCP_RX_SN wraps around and the PDCP PDU with SN =
        0 received on the associated non-duplication logical channel has been received on the
        associated non-duplication logical channel:
            discard the PDCP PDU;
        if a PDCP SDU with the same PDCP SN is stored:
            discard the PDCP PDU;
        else:
            perform deciphering of the PDCP PDU and store the resulting PDCP SDU;
        if received PDCP SN = Last_Submitted_PDCP_RX_SN + 1 or received PDCP SN =
        Last_Submitted_PDCP_RX_SN - Maximum_PDCP_SN:
            deliver to upper layers in ascending order of the associated COUNT value:
                all stored PDCP SDU(s) with consecutively associated COUNT value(s) starting
                from the COUNT value associated with the received PDCP PDU;
            set Last_Submitted_PDCP_RX_SN to the PDCP SN of the last PDCP SDU
            delivered to upper layers;
```

In another alternative, the (receiving) UE could conditionally maintain parameter(s) used for sidelink reception. The UE could receive a PDCP PDU (with SN=0) on a first logical channel. The UE could also receive a PDCP PDU (with SN=0) on a second logical channel. The PDCP PDU (with SN=0) received on the second logical channel could be a duplicate of the PDCP PDU (with SN=0) received on the first logical channel. A PDCP SDU of the PDCP PDU (with SN=0) received on the second logical channel could be the same as a PDCP SDU of the PDCP PDU (with SN=0) received on the first logical channel. The first logical channel could be a non-duplication logical channel. The second logical channel could be a duplication logical channel. The duplication logical channel could be associated with the non-duplication logical channel.

In one embodiment, the UE could (start to) maintain the parameter(s) used for sidelink reception if a first PDCP PDU is received on the first logical channel. The SN of the first PDCP PDU could be '0'. For example, the value of the parameter(s) used for sidelink reception could be '0' before receiving the first PDCP PDU on the first logical channel. For example, the UE could set the parameter(s) used for sidelink reception based on the SN of the first PDCP PDU when the first PDCP PDU is received on the first logical channel, or based on the SN of the first PDCP PDU after receiving the first PDCP PDU on the first logical channel. The UE could set the parameter(s) used for sidelink reception based on the SN of the first PDCP PDU upon reception of the first PDCP PDU on the first logical channel. The parameter(s) used for sidelink reception could be set to the SN of the first PDCP PDU+1 (='1'). The UE could (start to) perform a procedure (as specified in Section 5.1.2.1.4.1 *"Procedures when a PDCP PDU is received from the lower layers"* of 3GPP R2-1808921) used to handling the first PDCP PDU received from lower layer (with maintaining the parameter(s) used for sidelink reception).

In one embodiment, the UE could maintain the parameter(s) used for sidelink reception if a second PDCP PDU is received on the first logical channel. The SN of the second PDCP PDU could be different from the SN of the first PDCP PDU. The SN of the second PDCP PDU could be '1' or larger than the SN of the first PDCP PDU. For example, the value of the parameter(s) used for sidelink reception could be '1' before receiving the second PDCP PDU on the first logical channel. The UE could set the parameter(s) used for sidelink reception based on the SN of the second PDCP PDU when the second PDCP PDU is received on the first logical channel, based on the SN of the second PDCP PDU after receiving the second PDCP PDU on the first logical channel, or based on the SN of the second PDCP PDU upon reception of the second PDCP PDU on the first logical channel. The parameter(s) used for sidelink reception could be set to the SN of the second PDCP PDU+1 (='2'). The UE could perform a procedure (as specified in Session 5.1.2.1.4.1 *"Procedures when a PDCP PDU is received from the lower layers"* of 3GPP R2-1808921) used to handling the second PDCP PDU received from lower layer (with maintaining the parameter(s) used for sidelink reception).

If the SN of the second PDCP PDU could be the same as the SN of the first PDCP PDU, the UE could (start to) not maintain the parameter(s) used for sidelink reception. The SN of the second PDCP PDU could be '0'. For example, the value of the parameter(s) used for sidelink reception could '1' before receiving the second PDCP PDU on the first logical channel. For example, the UE could not set the parameter(s) used for sidelink reception based on the SN of the second PDCP PDU when the second PDCP PDU is received on the first logical channel, based on the SN of the second PDCP PDU after receiving the second PDCP PDU on the first logical channel, or based on the SN of the second PDCP PDU upon reception of the second PDCP PDU on the first logical channel. The parameter(s) used for sidelink reception could be (maintained as) the SN of the first PDCP PDU+1 (='1'). The parameter(s) used for sidelink reception could be released. The UE could not perform a procedure (as specified in Section 5.1.2.1.4.1 *"Procedures when a PDCP PDU is received from the lower layers"* of 3GPP R2-1808921) used to handling the second PDCP PDU received from lower layer (with maintaining the parameter(s) used for sidelink reception). Alternatively, the UE could perform another procedure (as specified in Section 5.1.2.1.3 *"Procedures for DRBs mapped on RLC UM"* of 3GPP TS 36.323) used to handling the second PDCP PDU received from lower layer (without maintaining the parameter(s) used for sidelink reception).

In one embodiment, the UE could (start to) maintain the parameter(s) used for sidelink reception if a first PDCP PDU is received on the second logical channel. The SN of the first PDCP PDU could be '0'.

In one embodiment, the UE could maintain the parameter(s) used for sidelink reception if a second PDCP PDU is received on the second logical channel. The SN of the second PDCP PDU received on the second logical channel could be different from the SN of the first PDCP PDU received on the second logical channel. The SN of the second PDCP PDU could be '1' or larger than the SN of the first PDCP PDU.

In one embodiment, the parameter(s) used for sidelink reception could be Next_PDCP_RX_SN or RX_HFN.

In FIGS. 14, 15, 16 and 17, the T could mean the timing of the corresponding event. The larger number of T could mean the corresponding event occurs later than or together with the event of T with smaller number.

Figure 18:
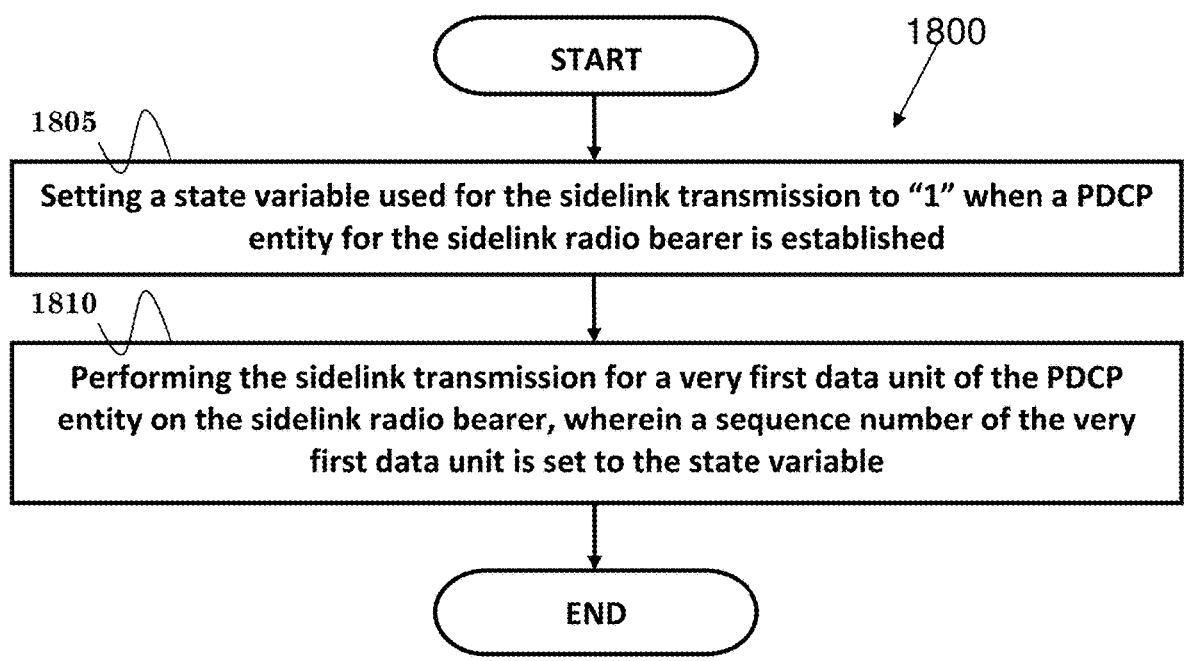
FIG. 18 is a flow chart according to one exemplary embodiment.

FIG. 18 is a flow chart 1800 according to one exemplary embodiment from the perspective of a UE. In step 1805, the UE sets a state variable used for the sidelink transmission to "1" when a PDCP entity for the sidelink radio bearer is established. In step 1810, the UE performs the sidelink transmission for a very first data unit of the PDCP entity on the sidelink radio bearer, wherein a sequence number of the very first data unit is set to the state variable.

In one embodiment, the UE could set the state variable to "1" if duplication is enable on the sidelink radio bearer. The UE could also set the state variable to "0" if duplication is disable on the sidelink radio bearer.

In one embodiment, the UE could establish a first logical channel and a second logical channel, wherein the first logical channel and the second logical channel are associated with the sidelink radio bearer.

In one embodiment, the UE could generate a duplicated data unit, wherein the duplicated data unit is a duplicate of the very first data unit. The UE could also deliver the very first data unit to the first logical channel and the duplicated data unit to the second logical channel for the sidelink transmission. In one embodiment, the duplicated data unit could be a PDCP PDU.

In one embodiment, the state variable could be Next_PDCP_TX_SN. The sequence number could be a PDCP sequence number. The data unit could be a PDCP PDU.

Referring back to FIGS. 3 and 4, in one exemplary embodiment of a UE, the device 300 includes a program code 312 stored in the memory 310. The CPU 308 could execute program code 312 to enable the UE (i) to set a state variable used for the sidelink transmission to "1" when a PDCP entity for the sidelink radio bearer is established, and (ii) to perform the sidelink transmission for a very first data unit of the PDCP entity on the sidelink radio bearer, wherein a sequence number of the very first data unit is set to the state variable. Furthermore, the CPU 308 can execute the program code 312 to perform all of the above-described actions and steps or others described herein.

Figure 19:
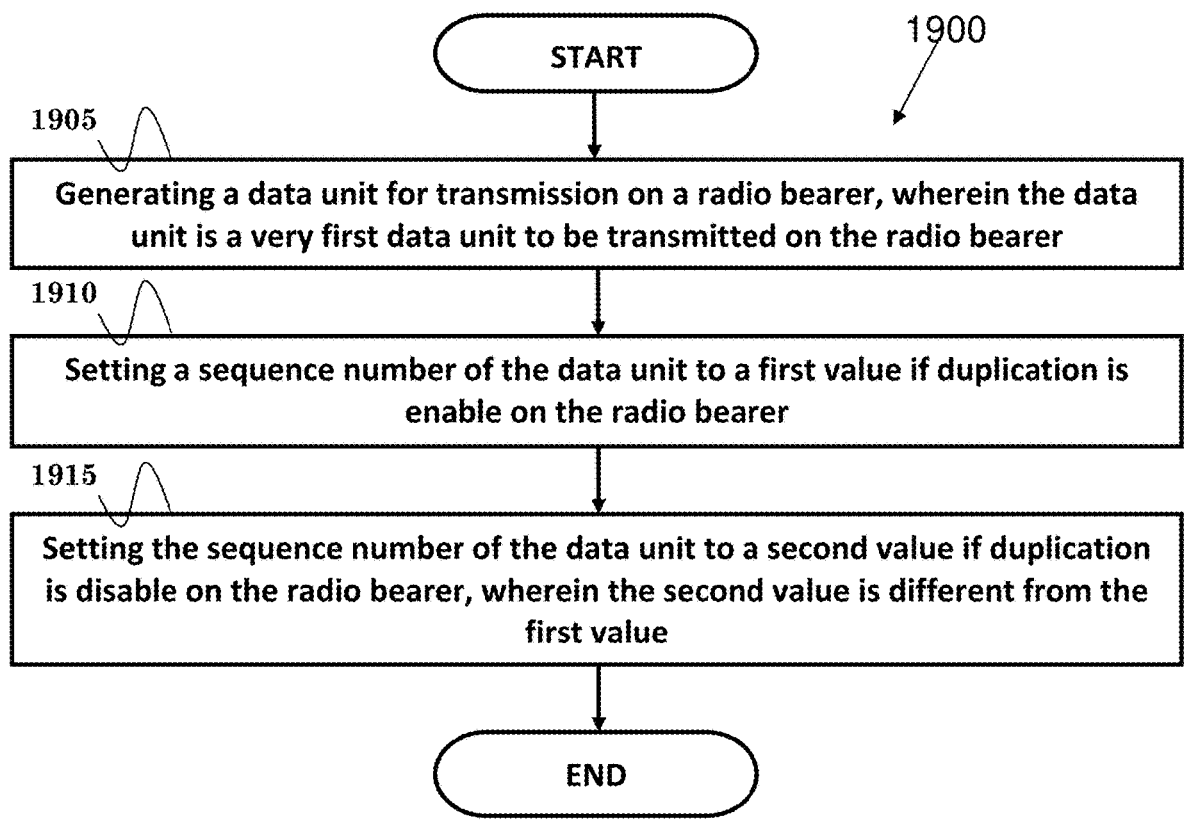
FIG. 19 is a flow chart according to one exemplary embodiment.

FIG. 19 is a flow chart 1900 according to one exemplary embodiment from the perspective of a UE. In step 1905, the UE generates a data unit for transmission on a radio bearer, wherein the data unit is a very first data unit to be transmitted on the radio bearer. In step 1910, the UE sets a sequence number of the data unit to a first value if duplication is enable on the radio bearer. In step 1915, the UE sets the sequence number of the data unit to a second value if duplication is disable on the radio bearer, wherein the second value is different from the first value.

In one embodiment, the UE could transmit the data unit with the sequence number to a second UE. The data unit could be a PDCP SDU. The radio bearer is a sidelink radio bearer. The first value could be "1" or a number larger than "0". The second value could be "0".

In one embodiment, the sequence number could be a PDCP SN. The sequence number could be set based on Next_PDCP_TX_SN. The Next_PDCP_TX_SN could initially be set to "0", and could be incremented by one before setting the sequence number. Alternatively, the Next_PDCP_TX_SN could initially be set to "1".

In one embodiment, the duplication could be enabled on the radio bearer if PDCP duplication transmission is configured. Furthermore, the duplication could be enabled on the radio bearer if a reliability of the radio bearer is higher than or equal to a threshold.

In one embodiment, the duplication could be disabled on the radio bearer if PDCP duplication transmission is configured. Furthermore, the duplication could be disabled on the radio bearer if a reliability of the radio bearer is lower than a threshold. The reliability of the radio bearer could be a PPPR. The threshold could be provided in a configuration used to configure the PDCP duplication transmission.

In one embodiment, the UE could generate a PDCP PDU for transmission of the data unit if the duplication is disabled on the radio bearer. The PDCP PDU could be transmitted on a non-duplication logical channel.

In one embodiment, the UE could generate a first PDCP PDU for transmission of the data unit and a second PDCP PDU for transmission of the data if the duplication is enable on the radio bearer. The first PDCP PDU could be transmitted on a non-duplication logical channel. The second PDCP PDU could be transmitted on a duplication logical channel.

Referring back to FIGS. 3 and 4, in one exemplary embodiment of a UE, the device 300 includes a program code 312 stored in the memory 310. The CPU 308 could execute program code 312 to enable the UE (i) to generate a data unit for transmission on a radio bearer, wherein the data unit is a very first data unit to be transmitted on the radio bearer, (ii) to set a sequence number of the data unit to a first value if duplication is enable on the radio bearer, and (iii) to set the sequence number of the data unit to a second value if duplication is disable on the radio bearer, wherein the second value is different from the first value. Furthermore, the CPU 308 can execute the program code 312 to perform all of the above-described actions and steps or others described herein.

Figure 20:
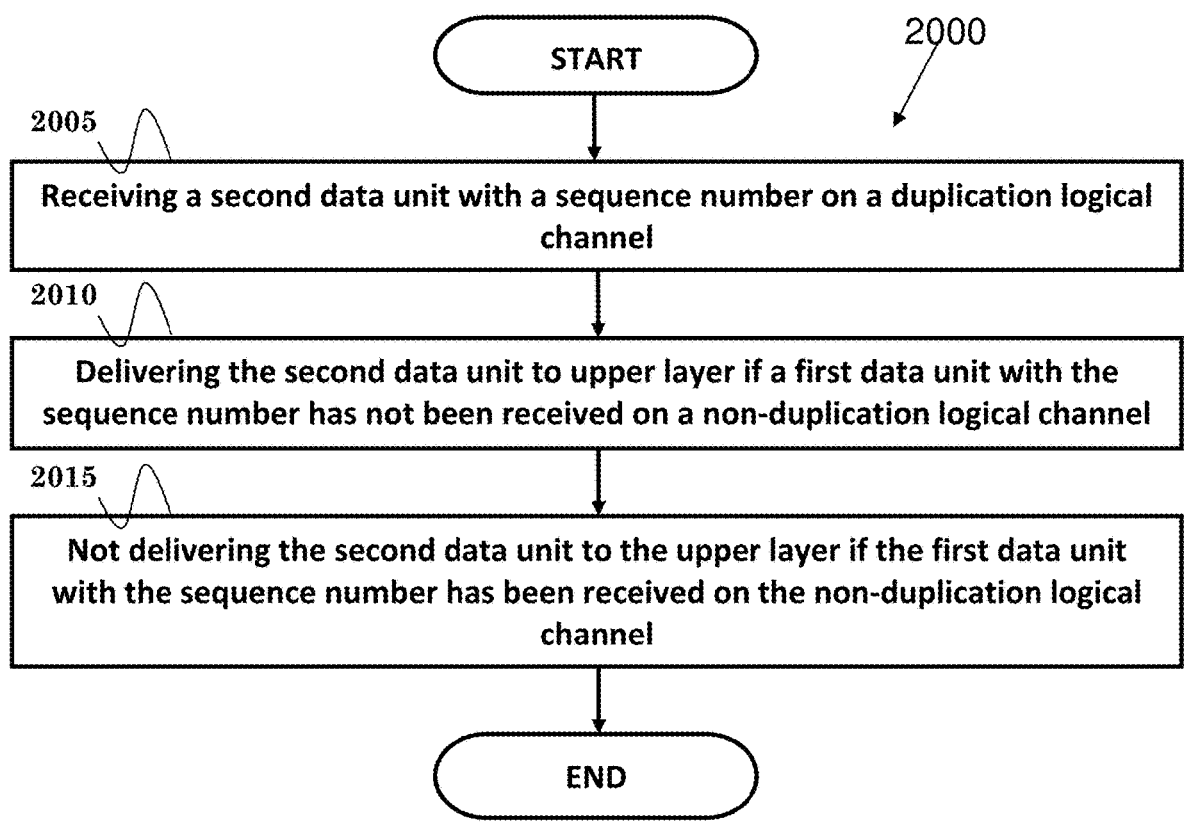
FIG. 20 is a flow chart according to one exemplary embodiment.

FIG. 20 is a flow chart 2000 according to one exemplary embodiment from the perspective of a UE. In step 2005, the UE receives a second data unit with a sequence number on a duplication logical channel. In step 2010, the UE delivers the second data unit to upper layer if a first data unit with the sequence number has not been received on a non-duplication logical channel. In step 2015, the UE does not delivering the second data unit to the upper layer if the first data unit with the sequence number has been received on the non-duplication logical channel.

In one embodiment, the first data unit could be received from a second UE, and the second data unit could be received from the second UE. The sequence number could be "0". The sequence number could also be a PDCP SN. The first data unit could be a first PDCP SDU, and the second data unit could be a second PDCP SDU. In one embodiment, the first data unit could be the same as the second data unit.

In one embodiment, the upper layer could be a layer on top of a PDCP layer of the first UE. The upper layer could be an IP layer or an application layer.

Referring back to FIGS. 3 and 4, in one exemplary embodiment of a UE, the device 300 includes a program code 312 stored in the memory 310. The CPU 308 could execute program code 312 to enable the UE (i) to receive a second data unit with a sequence number on a duplication logical channel, (ii) to deliver the second data unit to upper layer if a first data unit with the sequence number has not been received on a non-duplication logical channel, and (iii) to not deliver the second data unit to the upper layer if the first data unit with the sequence number has been received on the non-duplication logical channel. Furthermore, the CPU 308 can execute the program code 312 to perform all of the above-described actions and steps or others described herein.

Figure 21:
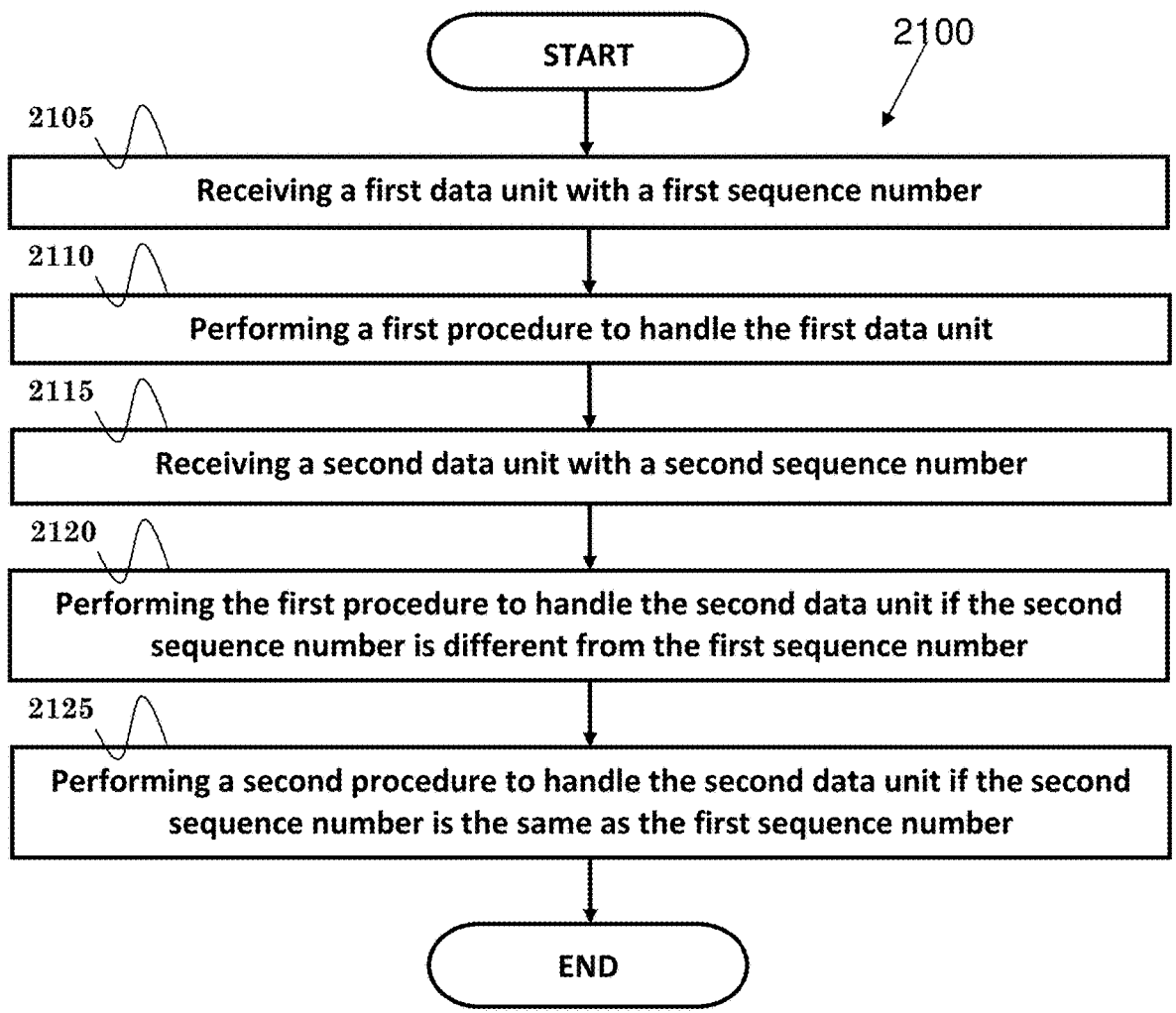
FIG. 21 is a flow chart according to one exemplary embodiment.

FIG. 21 is a flow chart 2100 according to one exemplary embodiment from the perspective of a UE. In step 2105, the UE receives a first data unit with a first sequence number. In step 2110, the UE performs a first procedure to handle the first data unit. In step 2115, the UE receives a second data unit with a second sequence number. In step 2120, the UE performs the first procedure to handle the second data unit if the second sequence number is different from the first sequence number. In step 2125, the UE performs a second procedure to handle the second data unit if the second sequence number is the same as the first sequence number.

In one embodiment, the first procedure used to handle the first data unit could update a parameter used for reception based on the first sequence number. The first sequence number could be zero (0). The first procedure used to handle the second data unit could update the parameter used for reception based on the second sequence number if the second sequence number is different from the first sequence number. The second sequence number could be larger than zero (0).

In one embodiment, the second procedure used to handle the second data unit may not update the parameter used for reception based on the second sequence number if the second sequence number is the same as the first sequence number. The second sequence number could be zero (0).

In one embodiment, the first data unit could be received on a non-duplication logical channel. The second data unit could be received on a non-duplication logical channel. In particular, the first data unit could be received from a second UE, and the second data unit could be received from the second UE.

In one embodiment, the first data unit could be a PDCP SDU, and the second data unit could be a PDCP SDU. The first data unit could be a very first data unit received on the non-duplication logical channel, and the second data unit may not be a very first data unit received on the non-duplication logical channel.

In one embodiment, the first sequence number could be a PDCP SN, and the second sequence number could be a PDCP SN. The parameter used for reception could be Next_PDCP_RX_SN.

In one embodiment, the UE could set the parameter used for reception to the first sequence number+1. Alternatively, the UE could set the parameter used for reception to the second sequence number+1 if the second sequence number is different from the first sequence number. In addition, the UE may not set the parameter used for reception to the second sequence number+1 if the second sequence number is the same as the first sequence number.

In one embodiment, the non-duplication logical channel could be associated with the duplication logical channel.

Referring back to FIGS. 3 and 4, in one exemplary embodiment of a UE, the device 300 includes a program code 312 stored in the memory 310. The CPU 308 could execute program code 312 to enable the UE (i) to receive a first data unit with a first sequence number, (ii) to perform a first procedure to handle the first data unit, (iii) to receive a second data unit with a second sequence number, (iv) to perform the first procedure to handle the second data unit if the second sequence number is different from the first sequence number, and (v) to perform a second procedure to handle the second data unit if the second sequence number is the same as the first sequence number. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a UE (User Equipment) to perform sidelink transmission on a sidelink radio bearer, comprising:
setting a state variable used for the sidelink transmission to "1" when a PDCP (Packet Data Convergence Protocol) entity for the sidelink radio bearer is established; and
performing the sidelink transmission for a very first data unit of the PDCP entity on the sidelink radio bearer, wherein a sequence number of the very first data unit is set to the state variable.

2. The method of claim 1, further comprising:
setting the state variable to "1" if duplication is enable on the sidelink radio bearer.

3. The method of claim 1, further comprising:
setting the state variable to "0" if duplication is disable on the sidelink radio bearer.

4. The method of claim 1, further comprising:
establishing a first logical channel and a second logical channel, wherein the first logical channel and the second logical channel are associated with the sidelink radio bearer.

5. The method of claim 4, further comprising:
generating a duplicated data unit, wherein the duplicated data unit is a duplicate of the very first data unit; and
delivering the very first data unit to the first logical channel and the duplicated data unit to the second logical channel for the sidelink transmission.

6. The method of claim 5, wherein the duplicated data unit is a PDCP PDU (Protocol Data Unit).

7. The method of claim 1, wherein the state variable is Next_PDCP_TX_SN.

8. The method of claim 1, wherein the sequence number is a PDCP sequence number.

9. The method of claim 1, wherein the data unit is a PDCP PDU (Protocol Data Unit).

10. A User Equipment (UE) to perform sidelink transmission on a sidelink radio bearer, comprising:
a control circuit;
a processor installed in the control circuit; and
a memory installed in the control circuit and operatively coupled to the processor;
wherein the processor is configured to execute a program code stored in the memory to:
set a state variable used for the sidelink transmission to "1" when a PDCP (Packet Data Convergence Protocol) entity for the sidelink radio bearer is established; and
perform the sidelink transmission for a very first data unit of the PDCP entity on the sidelink radio bearer, wherein a sequence number of the very first data unit is set to the state variable.

11. The UE of claim 10, wherein the processor is configured to execute a program code stored in the memory to:
set the state variable to "1" if duplication is enable on the sidelink radio bearer.

12. The UE of claim 10, wherein the processor is configured to execute a program code stored in the memory to:
set the state variable to "0" if duplication is disable on the sidelink radio bearer.

13. The UE of claim 10, wherein the processor is configured to execute a program code stored in the memory to:
establish a first logical channel and a second logical channel, wherein the first logical channel and the second logical channel are associated with the sidelink radio bearer.

14. The UE of claim 10, wherein the processor is configured to execute a program code stored in the memory to:
generate a duplicated data unit, wherein the duplicated data unit is a duplicate of the very first data unit; and
deliver the very first data unit to the first logical channel and the duplicated data unit to the second logical channel for the sidelink transmission.

15. The UE of claim 14, wherein the duplicated data unit is a PDCP PDU (Protocol Data Unit).

16. The UE of claim 10, wherein the state variable is Next_PDCP_TX_SN.

17. The UE of claim 10, wherein the sequence number is a PDCP sequence number.

18. The UE of claim 10, wherein the data unit is a PDCP PDU (Protocol Data Unit).

* * * * *